US011658786B2

United States Patent
He et al.

(10) Patent No.: US 11,658,786 B2
(45) Date of Patent: May 23, 2023

(54) CONFIGURATION AND PROCEDURE FOR SEARCH SPACE USED IN SMALL DATA TRANSFER OVER PRE-CONFIGURED UPLINK RESOURCES

(71) Applicant: QUALCOMM Incorporated, San Diego, CA (US)

(72) Inventors: Linhai He, San Diego, CA (US); Ruiming Zheng, Beijing (CN); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/683,225

(22) Filed: Feb. 28, 2022

(65) Prior Publication Data

US 2023/0022523 A1  Jan. 26, 2023

Related U.S. Application Data

(63) Continuation of application No. PCT/CN2021/106990, filed on Jul. 19, 2021.

(51) Int. Cl.
*H04L 5/00* (2006.01)
*H04B 17/318* (2015.01)

(52) U.S. Cl.
CPC ......... *H04L 5/0051* (2013.01); *H04B 17/318* (2015.01); *H04L 5/006* (2013.01)

(58) Field of Classification Search
CPC ...... H04L 5/0051; H04L 5/006; H04B 17/318
See application file for complete search history.

(56) References Cited

U.S. PATENT DOCUMENTS

2017/0171842 A1   6/2017  You et al.
2020/0229161 A1*  7/2020  Raghavan ............. H04L 5/0091
(Continued)

FOREIGN PATENT DOCUMENTS

CN     109952747 A    6/2019
CN     112262597 A    1/2021

OTHER PUBLICATIONS

International Search Report and Written Opinion—PCT/CN2021/106990—ISA/EPO—dated Feb. 25, 2022.
(Continued)

*Primary Examiner* — Jamal Javaid
*Assistant Examiner* — Ryan C Kavleski
(74) *Attorney, Agent, or Firm* — Procopio, Cory, Hargreaves & Savitch

(57) ABSTRACT

A UE and a base station are disclosed. The UE may receive, from a base station, an indication of a configuration of an SS and a set of candidate DL-RSs associated with a plurality of CG-SDT resources. The base station may monitor for the UL data transmission from the UE corresponding to a CG-SDT occasion of the CG-SDT resources. The UE may measure a RSRP of each of the set of candidate DL-RSs associated with the CG-SDT resources. The UE may select an UL beam based on the measured RSRP of each of the set of candidate DL-RSs associated with the CG-SDT resources. The UE may transmit, to the base station via the selected UL beam, the UL data transmission over a CG-SDT occasion of the plurality of CG-SDT resources. The UE may monitor the SS for a response to the UL data transmission from the base station.

28 Claims, 12 Drawing Sheets

(56) References Cited

U.S. PATENT DOCUMENTS

| | | | |
|---|---|---|---|
| 2021/0315049 A1* | 10/2021 | Wei | H04W 76/36 |
| 2021/0337602 A1 | 10/2021 | Liu | |
| 2022/0022247 A1* | 1/2022 | Agiwal | H04W 72/042 |
| 2022/0061080 A1* | 2/2022 | Takeda | H04L 5/0094 |

OTHER PUBLICATIONS

Zte, et al., "Discussion on the Physical Layer Aspects of Small Data Transmission", 3GPP TSG RAN WG1 #104-e, R1-2100080, Feb. 5, 2021 (May 2, 2021), 7 Pages, Section 3.

* cited by examiner

CONFIGURATION AND PROCEDURE FOR SEARCH SPACE USED IN SMALL DATA TRANSFER OVER PRE-CONFIGURED UPLINK RESOURCES

CROSS REFERENCE TO RELATED APPLICATION(S)

This application is a continuation of International Application Serial No. PCT/CN2021/106990, entitled, "CONFIGURATION AND PROCEDURE FOR SEARCH SPACE USED IN SMALL DATA TRANSFER OVER PRE-CONFIGURED UPLINK RESOURCES" and filed Jul. 19, 2021, which is expressly incorporated by reference herein in its entirety.

TECHNICAL FIELD

The present disclosure relates generally to communication systems, and more particularly, to the small data transfer in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may receive, from a base station, an indication of a configuration of a search space (SS) and a set of candidate downlink reference signals (DL-RSs) associated with a plurality of configured grant (CG) small data transmission (SDT) (CG-SDT) resources. The plurality of CG-SDT resources may correspond to an uplink (UL) data transmission. The apparatus may measure a reference signal received power (RSRP) of each of the set of candidate DL-RSs associated with the plurality of CG-SDT resources. The apparatus may select an UL beam based on the measured RSRP of each of the set of candidate DL-RSs associated with the plurality of CG-SDT resources. The apparatus may transmit, to the base station via the selected UL beam, the UL data transmission over a CG-SDT occasion of the plurality of CG-SDT resources. The apparatus may monitor the SS for a response to the UL data transmission from the base station.

In an aspect of the disclosure, a method, a computer-readable medium, and an apparatus are provided. The apparatus may be a base station. The apparatus may configure an SS and a set of candidate DL-RSs associated with a plurality of CG-SDT resources. The plurality of CG-SDT resources may correspond to an UL data transmission. The apparatus may transmit, to a UE, an indication of the configuration of the SS and the set of candidate DL-RSs associated with the plurality of CG-SDT resources. The apparatus may monitor for the UL data transmission from the UE corresponding to a CG-SDT occasion of the plurality of CG-SDT resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
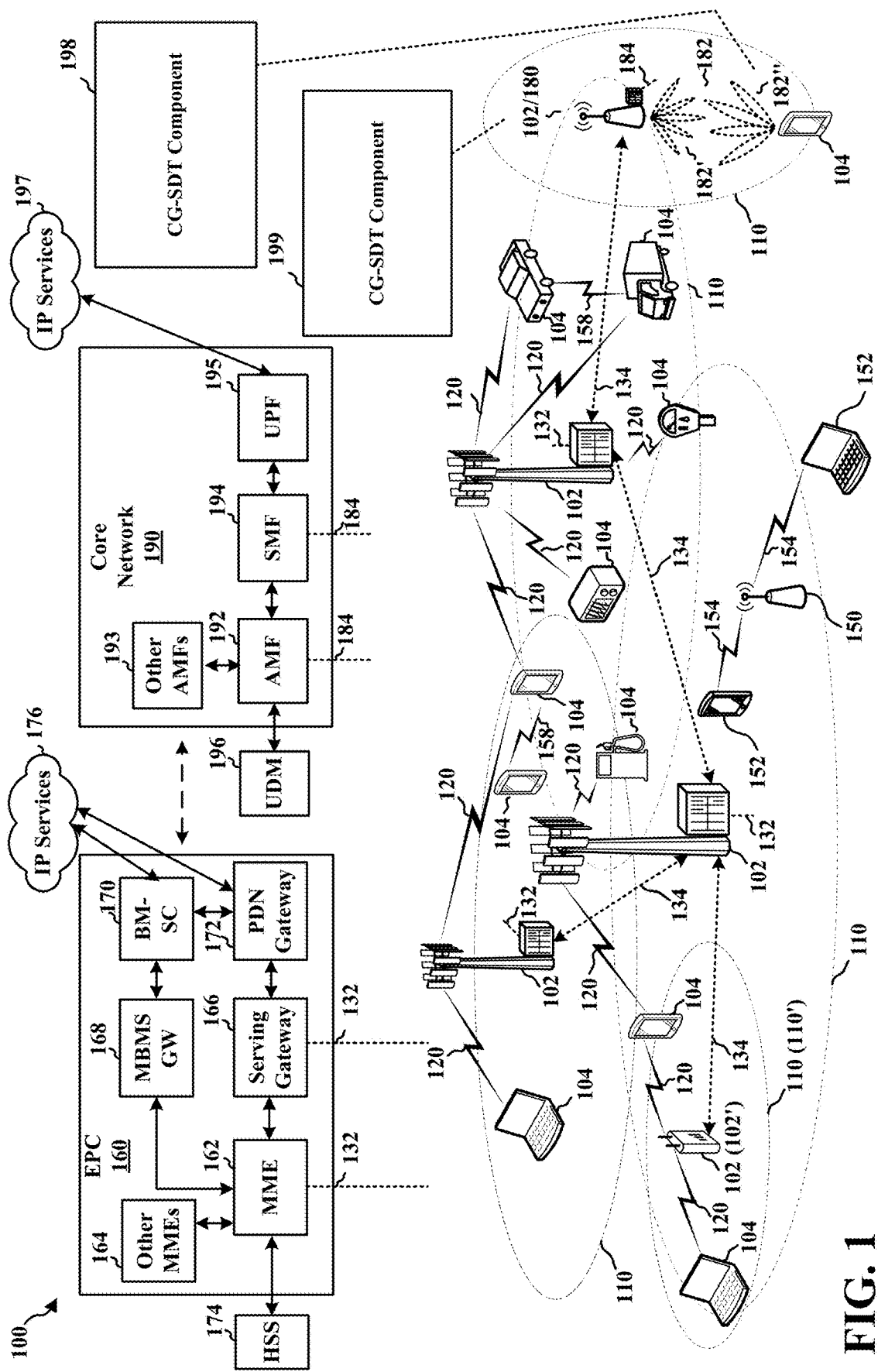
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/ UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ES S), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a CG-SDT component 198 that may be configured to receive, from a base station, an indication of a configuration of an SS and a set of candidate DL-RSs associated with a plurality of CG-SDT resources. The plurality of CG-SDT resources may correspond to an UL data transmission. The CG-SDT component 198 may be configured to measure a RSRP of each of the set of candidate DL-RSs associated with the plurality of CG-SDT resources. The CG-SDT component 198 may be configured to select an UL beam based on the measured RSRP of each of the set of candidate DL-RSs associated with the plurality of CG-SDT resources. The CG-SDT component 198 may be configured to transmit, to the base station via the selected UL beam, the UL data transmission over a CG-SDT occasion of the plurality of CG-SDT resources. The CG-SDT component 198 may be configured to monitor the SS for a response to the UL data transmission from the base station. In certain aspects, the base station 180 may include a CG-SDT component 199 that may be configured to configure an SS and a set of candidate DL-RSs associated with a plurality of CG-SDT resources. The plurality of CG-SDT resources may correspond to an UL data transmission. The CG-SDT component 199 may be configured to transmit, to a UE, an indication of the configuration of the SS and the set of candidate DL-RSs associated with the plurality of CG-SDT resources. The CG-SDT component 199 may be configured to monitor for the UL data transmission from the UE corresponding to a CG-SDT occasion of the plurality of CG-SDT resources. Although the following description may be focused on 5G NR, the concepts described herein may be applicable to other similar areas, such as LTE, LTE-A, CDMA, GSM, and other wireless technologies.

Figure 2:
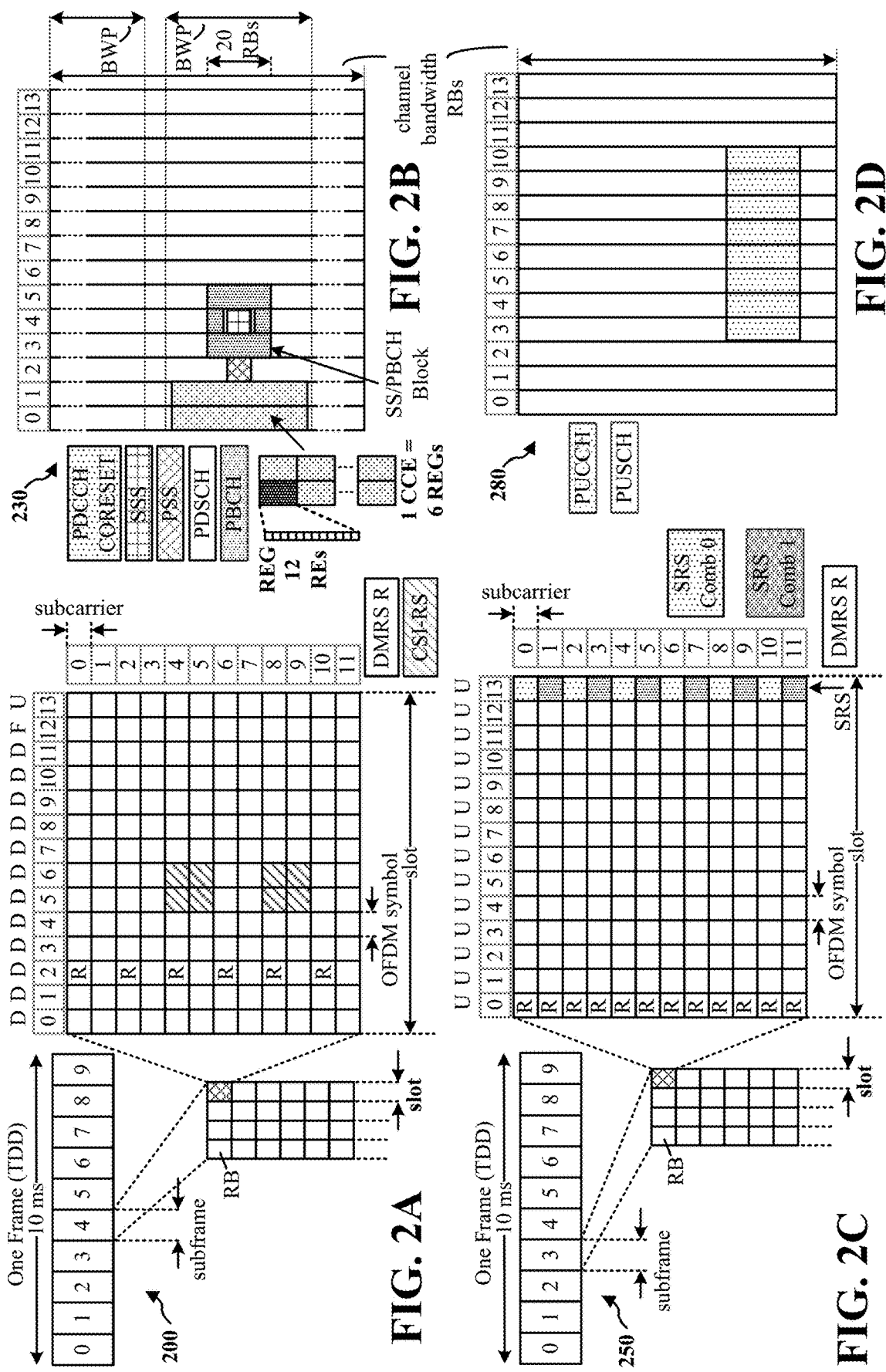
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame.

The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal/PBCH block (also referred to as synchronization signal block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame.

The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
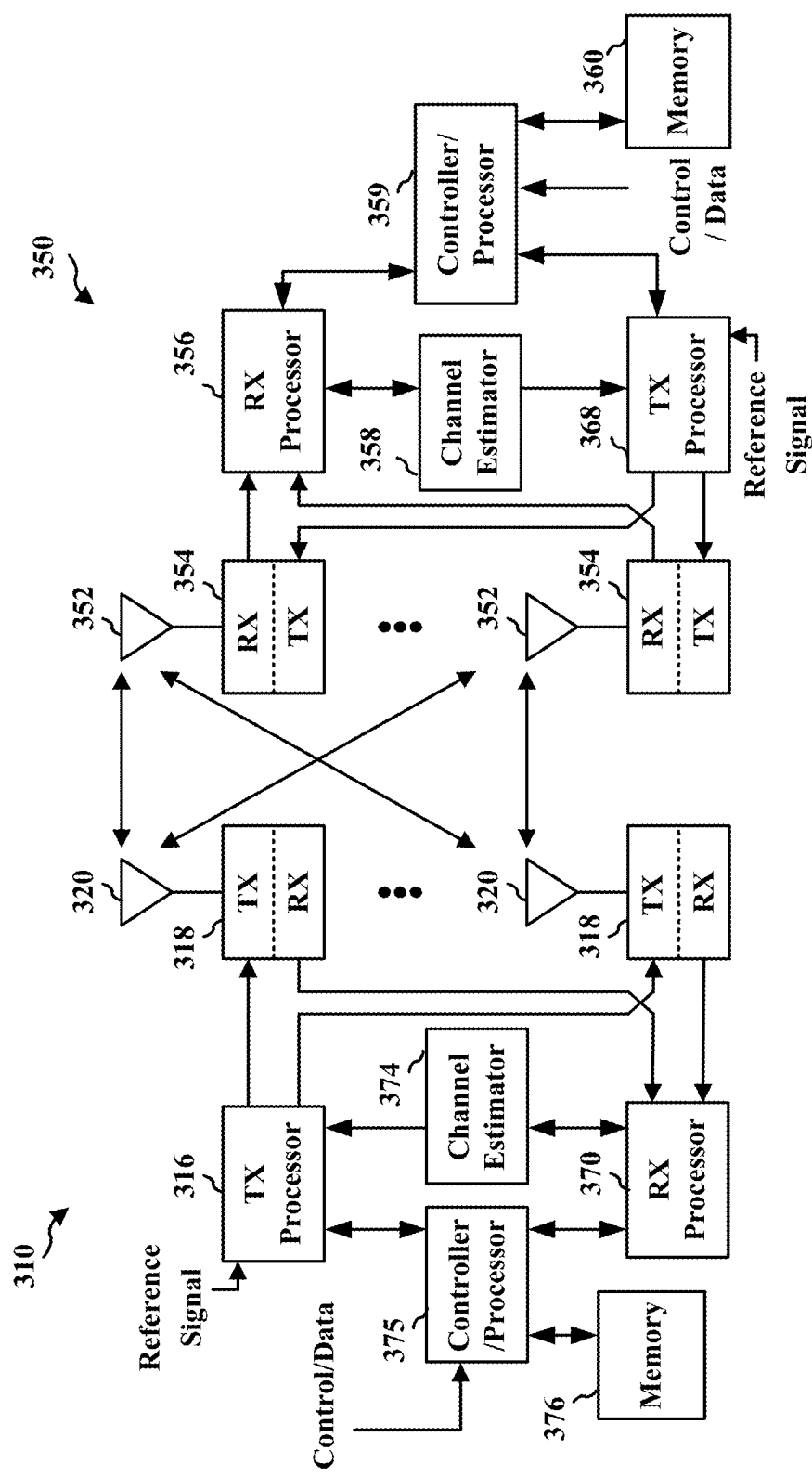
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356.

The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

With SDT, a UE may exchange data with a network while remaining in the RRC Idle state or the RRC Inactive state. This may be useful when a UE has a small amount of data (e.g., the amount of data being below a configured threshold) to transfer to the network. SDT may help to reduce the overhead associated with switching in and out of RRC Connected state and thus save power at the UE.

Random access (RA)—SDT (RA-SDT) may be one option for SDT, with which the

SDT is performed through the random access channel (RACH) procedure. For example, a UE may transmit the small amount of data to a network via message 3 or message 5 in the RACH procedure. The other option for SDT may be CG-SDT, with which the small amount of data may be transmitted over preconfigured uplink resources.

With CG-SDT, the network may preconfigure some uplink resources. These resources may consist of multiple occasions, each of which within a cluster may be associated with a respective, different DL-RS (e.g., an SSB) of a plurality of DL-RSs. The UE's usable UL beams may change when the UE is in the RRC Idle state or the RRC Inactive state. Therefore, before the UE may perform SDT over CG-SDT, the UE may select a suitable UL beam for its UL transmission. The UE may select a DL-RS of the plurality of DL-RSs based on RSRP measurements associated with the DL-RSs. The selected DL-RS may be associated with a highest RSRP measurement. The UE may select the suitable UL beam based on the selected DL-RS and beam correspondence. Accordingly, the UE-selected suitable UL beam may correspond to one of the configured CG-SDT resource occasions within a cluster. When the network receives the data from the UE, the network may identify the DL-RS selected by the UE based on the CG-SDT resource occasion the UE has used to transmit the data.

Figure 4:
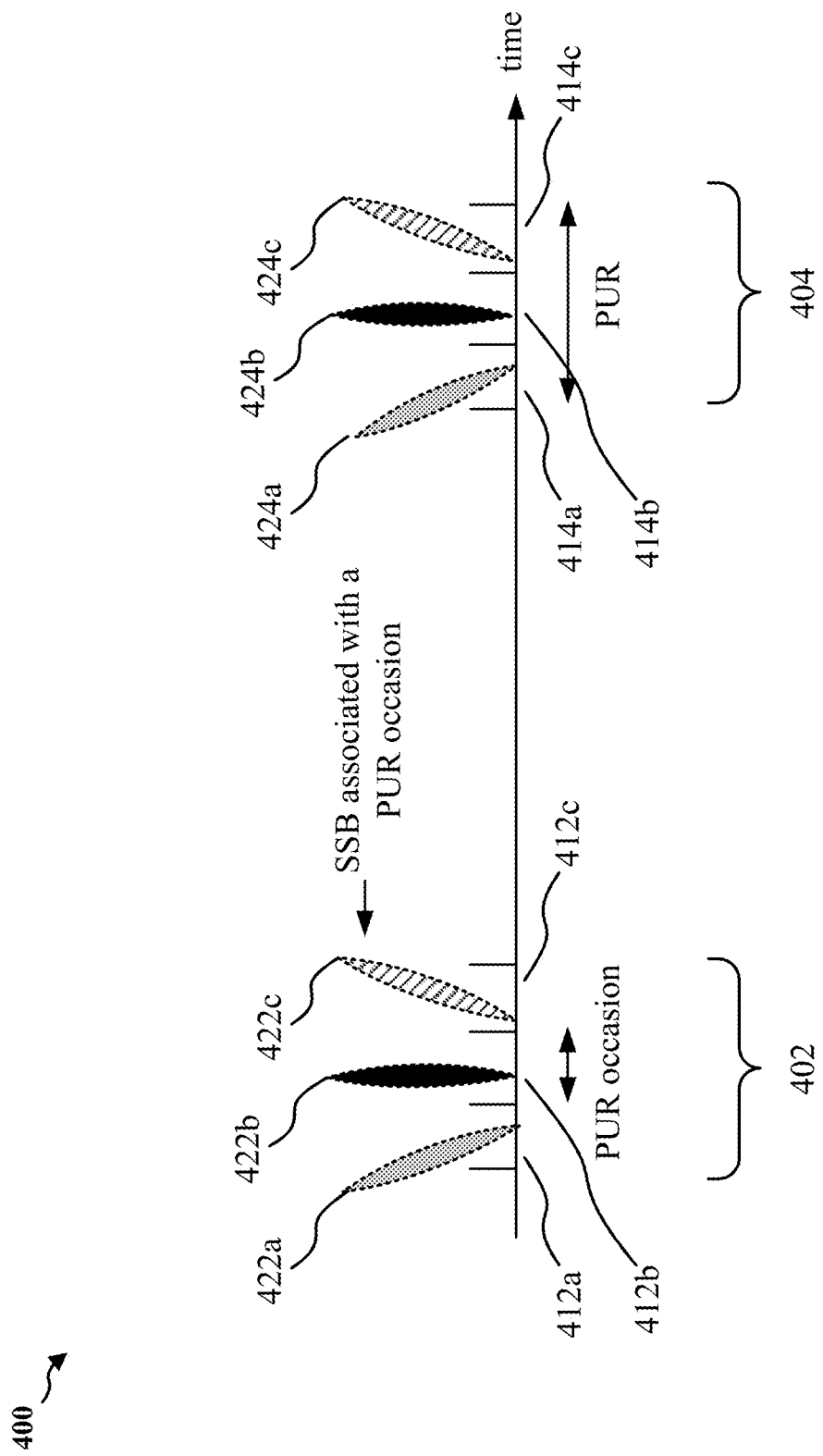
FIG. 4 is a diagram illustrating an example association between preconfigured uplink resources (PURs) and synchronization signal blocks (SSBs) to provide multi-beam support for SDT over PURs.

FIG. 4 is a diagram 400 illustrating an example association between preconfigured uplink resources (PURs) and SSBs to provide multi-beam support for SDT over PURs. Herein each PUR may also be referred to as a cluster of uplink resources. FIG. 4 shows a first PUR 402 and a second PUR 404. According to some aspects, a PUR, such as PUR 402, may refer to uplink resources that are preconfigured, e.g., allocated, to a UE before the UE has information to transmit. For example, PURs may be allocated to a UE without the UE first requesting uplink resources to communicate information on an uplink. In other words, PURs may be uplink resources that a UE may use in the future when the UE transmits information on an uplink. In some aspects, a PUR may reduce overhead associated with uplink communication. For example, a UE may use a PUR to transmit small amounts of data to a base station without first setting up an RRC connection with the base station. In other words, an RRC connection between a UE and a base station may not be needed for the UE to use a PUR to transmit information to the base station. Therefore, the UE may use the PUR to transmit information while the UE remains in an RRC Idle/Inactive state. In some aspects, a PUR, such as PUR 402 or PUR 404, may be associated with specific frequency and/or time resources.

According to some aspects, each PUR, such as PUR 402 or PUR 404, may include one or more distinct PUR occasions (or simply "resource occasions" or "occasions" hereinafter). For example, in FIG. 4, PUR 402 includes PUR occasions 412*a*, 412*b*, and 412*c*. Similarly, PUR 404 includes PUR occasions 414*a*, 414*b*, and 414*c*. In some aspects, the PUR occasions of a PUR may be associated with the same frequency resources. Frequency resources may refer to one or more subcarriers, or groups of one or more subcarriers, such as resource blocks. According to some aspects, each PUR occasion of a PUR may be associated with different time resources. Time resources may refer to one or more symbols, or groups of one or more symbols, such as slots, subframes, or frames. For example, each of PUR occasions 412*a*, 412*b*, and 412*c* may be associated with different time resources, e.g., one or more symbols, associated with PUR 402.

As illustrated in FIG. 4, each PUR occasion of a PUR may be associated with a different SSB. For example, in FIG. 4, PUR occasion 412*a* is associated with SSB 422*a*, PUR occasion 412*b* is associated with SSB 422*b*, and PUR occasion 412*c* is associated with SSB 422*c*. Similarly, PUR occasion 414*a* is associated with SSB 424*a*, PUR occasion 414*b* is associated with SSB 424*b*, and PUR occasion 414*c* is associated with SSB 424*c*.

In some aspects, the indication of one or more distinct SSBs associated with the one or more distinct PUR occasions may include a list of SSBs and a mapping between SSBs and PUR occasions for each PUR so that a UE may know which SSBs are associated with each PUR occasion. For example, with reference to FIG. 4, the indication of one or more distinct SSBs associated with the one or more distinct PUR occasions may indicate that SSBs 422*a*, 422*b*, and 422*c* are associated with PUR occasions 412*a*, 412*b*, and 412*c*, respectively. As illustrated in FIG. 4, each PUR occasion of the one or more distinct PUR occasions may be associated with one SSB of the one or more distinct SSBs.

In some aspects, a UE may process the indicated one or more distinct SSBs to determine which PUR occasion to use for uplink communication. For example, in some aspects, a UE may measure RSRP associated with each SSB of the one or more distinct SSBs. According to some aspects, each SSB of the one or more distinct SSBs may be associated with one RSRP. In some aspects, the UE may identify at least one SSB whose associated RSRP is greater than, or equal to, a threshold. As one example with reference to FIG. 4, the UE may determine that the RSRP associated with SSB 422*b* and the RSRP associated with SSB 422*c* are both greater than, or equal to, the threshold. According to some aspects, the UE may select an SSB from the identified at least one SSB whose associated RSRP is greater than, or equal to, the threshold. In some aspects, the selected SSB may serve as the basis for UE uplink communication. For example, as described in more detail below, the UE may transmit information to the base station during a PUR occasion associated with the selected SSB. As an illustration with respect to FIG. 4, the UE may select SSB 422*b*, e.g., to serve as the basis for UE uplink communication. According to some aspects, the selection by the UE of an SSB from the identified at least one SSB whose associated RSRP is greater than, or equal to, the threshold may be based on various factors. For example, in one aspect, the UE may select the SSB with the strongest RSRP.

An SSB that is associated with an RSRP that is greater than, or equal to, the threshold may be the SSB selected from the identified at least one SSB whose associated RSRP is greater than, or equal to, the threshold. Then the PUR occasion during which the information is transmitted from the UE to the base station may be the PUR occasion associated with the selected SSB. As an illustration with respect to FIG. 4, the UE may transmit information to the base station during PUR occasion 412b when the UE selects SSB 422b from the identified at least one SSB whose associated RSRP is greater than, or equal to, the threshold.

According to some aspects, the UE may transmit the information during the PUR occasion using a transmission beam that has a beam correspondence with a beam associated with the SSB that is associated with the PUR occasion during which the information is transmitted. For example, in one aspect, the UE may transmit the information using a transmission beam that is a reciprocal, or a near reciprocal, of the reception beam used by the UE to receive the selected SSB. In another aspect, the UE may transmit the information using a transmission beam that points in the direction, or close to the direction, of the beam used by the base station to transmit the selected SSB.

In some aspects, the UE may transmit the information during the PUR occasion while the UE does not have the RRC connection with the base station, e.g., while the UE is in an RRC Idle/Inactive state. Similarly, the base station may receive the information during the PUR occasion while the UE does not have the RRC connection with the base station.

In some aspects, a UE may receive an indication of a search space associated with a CORESET that the UE may monitor for a response from the base station. Similarly, a base station may transmit an indication of the search space associated with the CORESET that the UE may monitor for a response from the base station. According to some aspects, the response may be responsive to the information transmitted by the UE during the PUR occasion associated with the SSB that is associated with the RSRP that is greater than, or equal to, the threshold. For example, in some aspects, the response may refer to DCI, e.g., DCI provided in a PDCCH. In some aspects, the search space may be defined based on CORESET 0. For example, the base station may inform the UE that the base station will sweep all beams to transmit the response, e.g., the DCI in the PDCCH, in CORESET 0. In some aspects, after receiving the information from the UE during the PUR occasion selected by the UE, the base station may transmit the response in the indicated search space associated with the CORESET, e.g., CORESET 0.

According to some aspects, after transmitting the information during the selected PUR occasion, the UE may monitor the indicated search space associated with the CORESET for the response from the base station. For example, the UE may monitor the PDCCH in the indicated search space over monitoring occasions that are quasi-co-located (QCL'ed) with their associated SSBs. In some aspects, the UE may select a reception beam to use to monitor the indicated search space based on various factors. For example, according to some aspects, the UE may monitor the indicated search space using a reception beam that has a beam correspondence with the transmission beam used to transmit the information during the selected PUR occasion. As an example, in one aspect, the UE may monitor the indicated search space using a reception beam that is a reciprocal, or a near reciprocal, of the transmission beam used by the UE to transmit the information during the PUR occasion associated with the SSB that is associated with the RSRP that is greater than, or equal to, the threshold.

In some aspects, the UE may start at least one timer associated with the monitoring of the indicated search space. According to some aspects, the at least one timer may include a retransmission timer and/or a round-trip time (RTT) timer. When the UE uses both the RTT timer and the retransmission timer, the UE may start the RTT timer first. For example, the UE may start the RTT timer after transmitting the information during the PUR occasion associated with the SSB that is associated with the RSRP that is greater than, or equal to, the threshold. In some aspects, the UE may not monitor the PDCCH in the indicated search space while the RTT timer is running. When the RTT timer expires, the UE may start the retransmission timer and may also start monitoring the indicated search space for the response from the base station. When the UE does not use the RTT timer, e.g., the UE uses the retransmission timer, the UE may start the retransmission timer after transmitting the information during the PUR occasion associated with the SSB that is associated with the RSRP that is greater than, or equal to, the threshold. In some aspects, the UE may monitor the indicated search space while the retransmission timer is running.

In some aspects, a UE may receive from a base station, and a base station may transmit to a UE, values for the retransmission timer and/or the RTT timer to be used by the UE. In additional aspects, the UE may know the values for the timers based on information provided in a wireless communication standard or specification. For example, in some aspects, the information from the wireless communication standard or specification may be programmed into the UE so that the UE may know the values for the timers.

According to some aspects, the UE may initiate a RACH operation to transmit the information to the base station when the at least one timer, e.g., the retransmission timer and/or the RTT timer, has expired and the UE has not received the response while monitoring the indicated search space for the response. For example, if the UE does not receive any DCI in the indicated search space upon expiry of the at least on timer, the UE may switch to a RACH-based SDT process (also known as RA-SDT). In additional aspects, upon expiry of the at least one timer, the UE may follow a traditional dynamic grant/assignment procedure per scheduling by the base station to transmit the information.

Aspects described herein may relate to configuring and using an SS for receiving a network response after the UE's transmission over CG-SDT, as well as for subsequent data transfers.

In one aspect, the network may configure a common SS (CSS) (e.g., a type-1 CSS) for the DL transmission of the response to the CG-SDT transmission. In some aspects, the network may not preconfigure a UE-specific SS (USS) for the UE to use in the RRC Idle state or the RRC Inactive state because a PDCCH message over a USS may be sent over a CORESET with a specific TCI state. Even if the network preconfigures a particular TCI state for the CORESET of this USS when the network releases the UE into the RRC Idle state or the RRC Inactive state, the preconfigured TCI state may not stay usable when the DL response is to be transmitted, as the UE may have adjusted its serving beam from time to time, in response to changes in channel conditions. On the other hand, a CORESET in a CSS may be associated with multiple TCI states. The UE may choose to receive the PDCCH messages using a suitable TCI state among those configured at the corresponding monitoring occasion. Accordingly, the network may pre-configure a CSS when the network releases the UE into the RRC Idle state or the RRC Inactive state.

Using a CSS for the DL transmission of the response to the CG-SDT transmission may be associated with certain limitations, however, especially in a TDD system. The CG-SDT may be configured in a UL BWP whose corresponding DL BWP contains CORESET 0. Configuring a wide bandwidth for the DL BWP containing CORESET 0 may not be desired because it may lead to higher power consumption at the UE. In some aspects, the center frequency of the UL BWPs of all UEs with CG-SDT configured may be located in a narrow band around CORESET 0. This may not be desirable in some use cases for some other reasons. For example, when many IoT UEs are deployed in a cell, a resource congestion around CORESET 0 in the frequency domain may occur.

Figure 5:
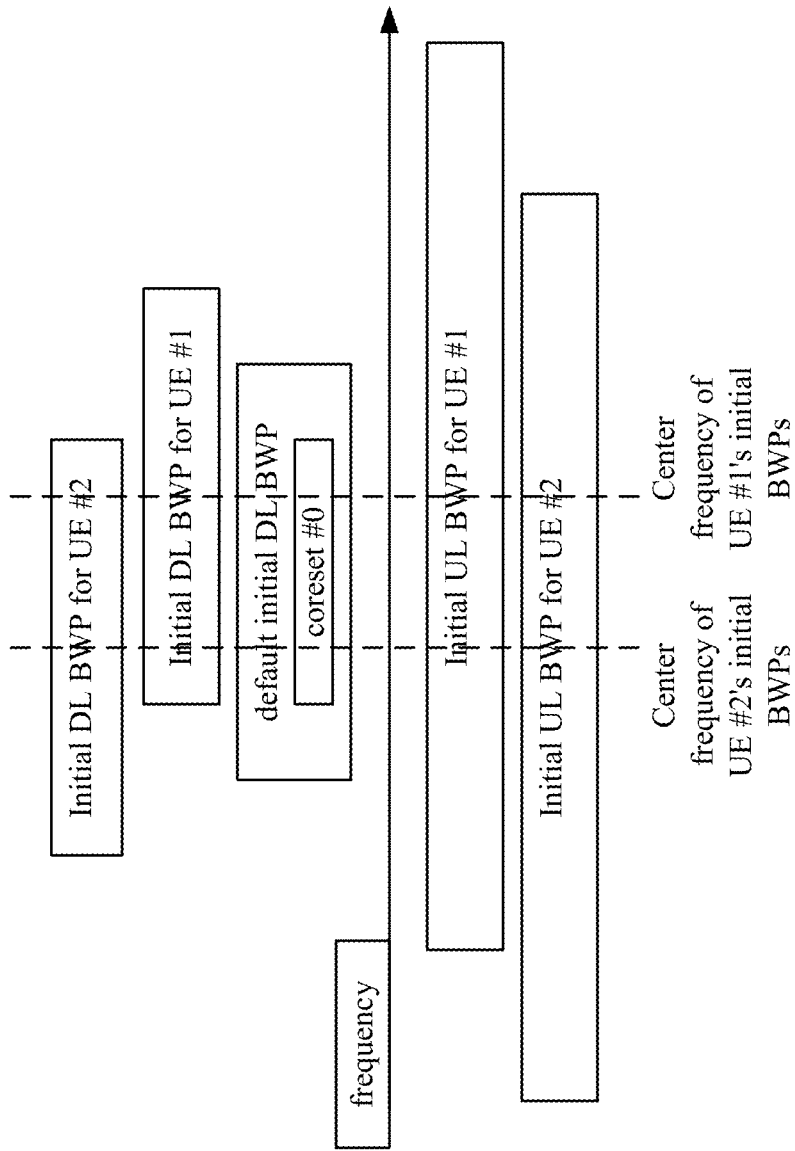
FIG. 5 is a diagram illustrating center frequencies of BWPs of the USSs associated with different UEs.

On the other hand, if the USS is used for the DL response to the CG-SDT transmission, the USS may be configured in a BWP located at any center frequency that the UE supports. FIG. 5 is a diagram 500 illustrating center frequencies of BWPs of the USSs associated with different UEs. As illustrated in FIG. 5, UE #1 and UE #2 may be configured with USSs with initial BWPs whose center frequencies are different from each other. Accordingly, the potential resource congestion in the frequency domain may be avoided.

By default, when configuring a USS, the network may use RRC signaling to configure a set of TCI states for the CORESET in the USS. The network may use L2 signaling (i.e., the medium access control (MAC)—control element (CE) (MAC-CE)) to activate one of the configured TCI states before UE may use the USS. Because the CG-SDT takes place when the UE is in the RRC Idle state or the RRC Inactive state, a CSS may be configured for a UE so that the UE may receive the TCI state activation MAC-CE from the network before the UE may use a USS.

Figure 6:
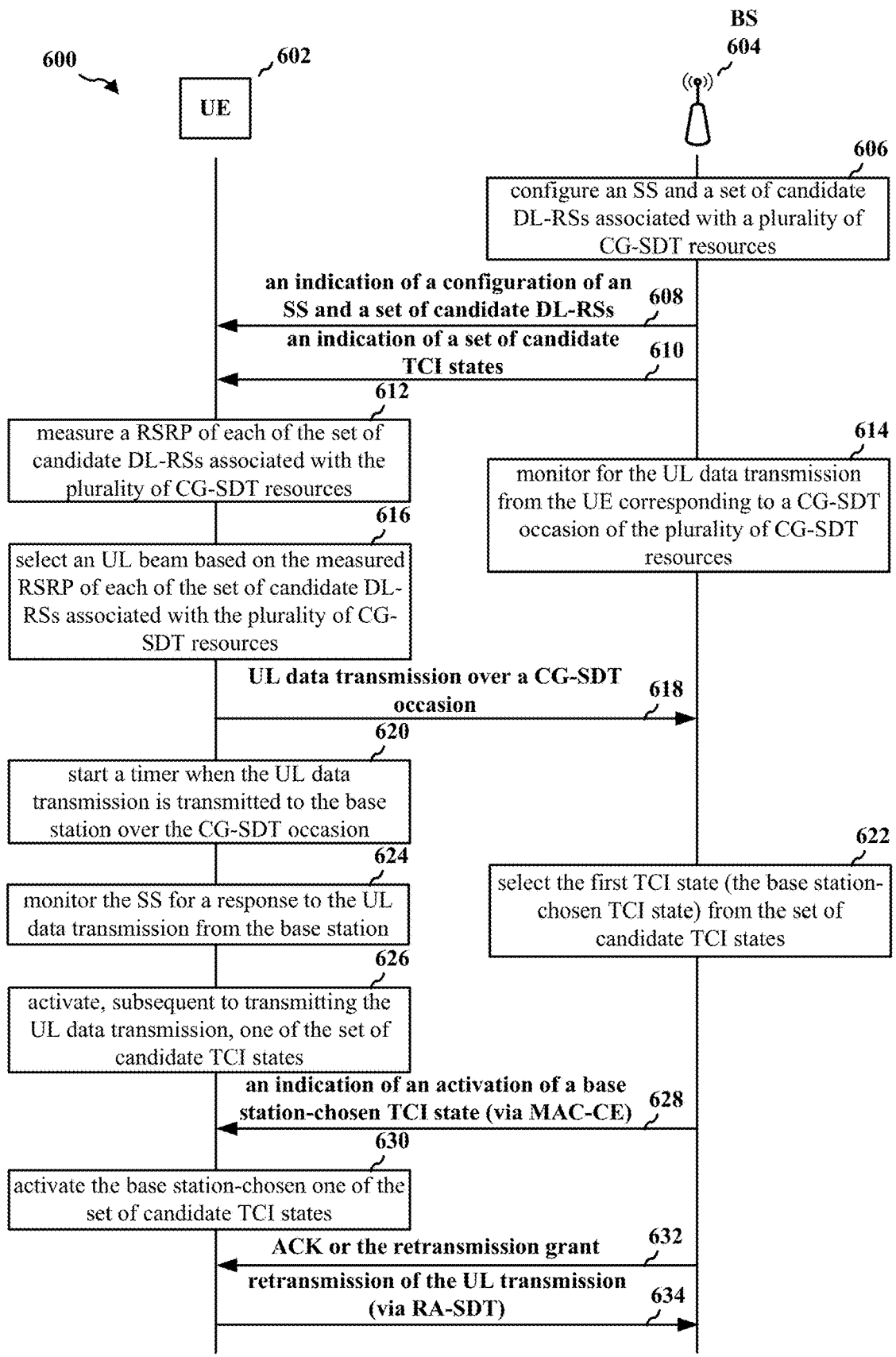
FIG. 6 is a diagram of a communication flow of a method of wireless communication.

FIG. 6 is a diagram 600 of a communication flow of a method of wireless communication. In one aspect, the base station 604 may configure a CSS for the UE 602 for the DL response to a CG-SDT transmission. At 606, the base station 604 may configure an SS and a set of candidate DL-RSs associated with a plurality of CG-SDT resources. At 608, the base station 604 may transmit, to a UE 602, an indication of the configuration of the SS and the set of candidate DL-RSs associated with the plurality of CG-SDT resources. The configured SS may be a CSS. The configuration of the CSS may be associated with releasing the UE into an RRC Idle state or an RRC Inactive state. The CSS may be associated with multiple TCI states. The set of candidate DL-RSs may include a set of SSB beams. The TCI states of the CORESET of this CSS may be defined in reference to the DL-RSs. In other words, each of the TCI states associated with the CSS may have a QCL relationship with a corresponding DL-RS. Further, as described above, each of the DL-RS may correspond to a respective CG-SDT resource occasion, and to respective UL beam based on beam correspondence. The CSS for the DL response for the CG-SDT transmission may be configured in a DL BWP that contains CORESET 0 (e.g., an initial BWP). Using a CSS may allow CG-SDT resources to be shared by multiple UEs, which may improve resource efficiency.

At 612, the UE 602 may measure a RSRP of each of the set of candidate DL-RSs associated with the plurality of CG-SDT resources. At 616, the UE 602 may select an UL beam based on the measured RSRP of each of the set of candidate DL-RSs associated with the plurality of CG-SDT resources. The selected UL beam may correspond to the candidate DL-RS with the highest or the strongest measured RSRP. At 614, the base station 604 may monitor for the UL data transmission from the UE 602 corresponding to a CG-SDT occasion of the plurality of CG-SDT resources. At 618, the UE 602 may transmit, to the base station 604 via the selected UL beam, the UL data transmission over a CG-SDT occasion of the plurality of CG-SDT resources.

At 624, the UE 602 may monitor the SS for a response to the UL data transmission from the base station 604. In particular, the UE 602 may monitor the configured CSS, for the response from the network, at a monitoring occasion associated with the DL-RS selected at 616.

Based on the CG-SDT occasion used at 618, the base station may identify the TCI state to be used for the DL response based on the correspondence between the TCI state, the DL-RS selected by the UE 602, and the CG-SDT occasion used by the UE 602. The DL response may be an acknowledgement (ACK) or a retransmission grant. At 632, the base station 604 may transmit, to the UE 602 based on the identified TCI state, an ACK or a retransmission grant based on the UL data transmission.

In one aspect, the UE may retransmit the UL data transmission over CG-SDT based on the retransmission grant received at 632. In another aspect, at 620, the UE 602 may start a timer when the UL data transmission is transmitted to the base station over the CG-SDT occasion. At 634, the UE 602 may re-transmit, to the base station 604, the UL data transmission via an RA-SDT if no response to the UL data transmission is received from the base station before the timer expires.

In another aspect, the network may configure a USS for the DL response to the CG-SDT transmission. In particular, the UE may autonomously activate the TCI state of its USS. At 606, the base station 604 may configure an SS and a set of candidate DL-RSs associated with a plurality of CG-SDT resources. At 608, the base station 604 may transmit, to a UE 602, an indication of the configuration of the SS and the set of candidate DL-RSs associated with the plurality of CG-SDT resources. The configured SS may be a USS. Unlike a CSS, the USS may be configured in a BWP which does not include CORESET 0. The configuration of the USS may be associated with releasing the UE into an RRC Idle state or an RRC Inactive state (e.g., the configuration may be provided by the base station 604 to the UE 602 when the base station 604 configures CG-SDT resources in an RRC Release message at 608). At 610, the base station 604 may transmit, to the UE 602, an indication of a set of candidate TCI states including a first TCI state. Each of the set of candidate TCI states may correspond to a DL-RS (e.g., through a QCL relationship) and to a CG-SDT resource occasion. None of the set of candidate TCI states may be activated at this stage. The first TCI state may be the TCI state based on which the base station 604 may transmit to the UE 602 the DL response to the CG-SDT transmission, as will be described in further detail below.

The UE 602 may perform a data transmission over CG-SDT, in the same way as described above. In other words, 612, 616, 614, and 618 may proceed in the same fashion as described above.

Subsequent to the CG-SDT transmission at 618, at 626, the UE 602 may activate, one of the set of candidate TCI states. The TCI state activated by the UE 602 may correspond to the DL-RS selected at 616. The UE 602 may use the activated TCI state to monitor the USS for the DL response from the base station 604.

In one aspect, subsequent to receiving the UL data transmission at 618, at 632, because the base station 604 is aware of the CG-SDT occasion used by the UE 602 at 618, the base station 604 may transmit, to the UE 602 based on the TCI state corresponding to the DL-RS selected by the UE 602 at 616 and to the CG-SDT occasion used by the UE 602 at 618, an ACK or a retransmission grant based on the UL data transmission.

In another aspect, at 622, the base station 604 may select another TCI state from the set of candidate TCI states for the transmission of the DL response. The TCI state selected at 622 may be based on the DL-RS selected by the UE 602, and may correspond to a narrower beam with a higher throughput. At 628, the base station 604 may transmit, to the UE 602 via a MAC-CE based on one of the TCI state corresponding to the DL-RS selected by the UE 602 at 616 and to the CG-SDT occasion used by the UE 602 at 618, an indication of an activation of the TCI state selected at 622. At 630, the UE 602 may activate the TCI state selected by the base station 604 at 622. At 632, the base station 604 may transmit, to the UE 602 based on the TCI state selected at 622, an ACK or a retransmission grant based on the UL data transmission.

In yet another aspect, the UE 602 may explicitly indicate, to the base station 604, a TCI state from the set of candidate TCI states for the transmission of the DL response. In particular, at 618, within the UL CG-SDT transmission, the UE 602 may include a MAC-CE within the PUSCH payload to indicate a TCI state selected by the UE 602 for the transmission of the DL response. The TCI state selected by the UE 602 for the transmission of the DL response may not be associated with the same QCL as the UL beam the UE 602 used for the CG-SDT transmission at 618. Subsequent to the transmission at 618, at 624, the UE 602 may monitor the SS for a response to the UL data transmission from the base station 604. At 626, the UE 602 may activate one of the set of candidate TCI states. In particular, the UE 602 may activate the TCI state selected by the UE 602 for the transmission of the DL response. At 632, the base station 604 may transmit, to the UE 602 based on the TCI state selected by the UE 602 for the transmission of the DL response, an ACK or a retransmission grant based on the UL data transmission.

In one aspect, the UE may retransmit the UL data transmission over CG-SDT based on the retransmission grant received at 632. In another aspect, at 620, the UE 602 may start a timer when the UL data transmission is transmitted to the base station over the CG-SDT occasion. At 634, the UE 602 may re-transmit, to the base station 604, the UL data transmission via an RA-SDT if no response to the UL data transmission is received from the base station before the timer expires.

Figure 7:
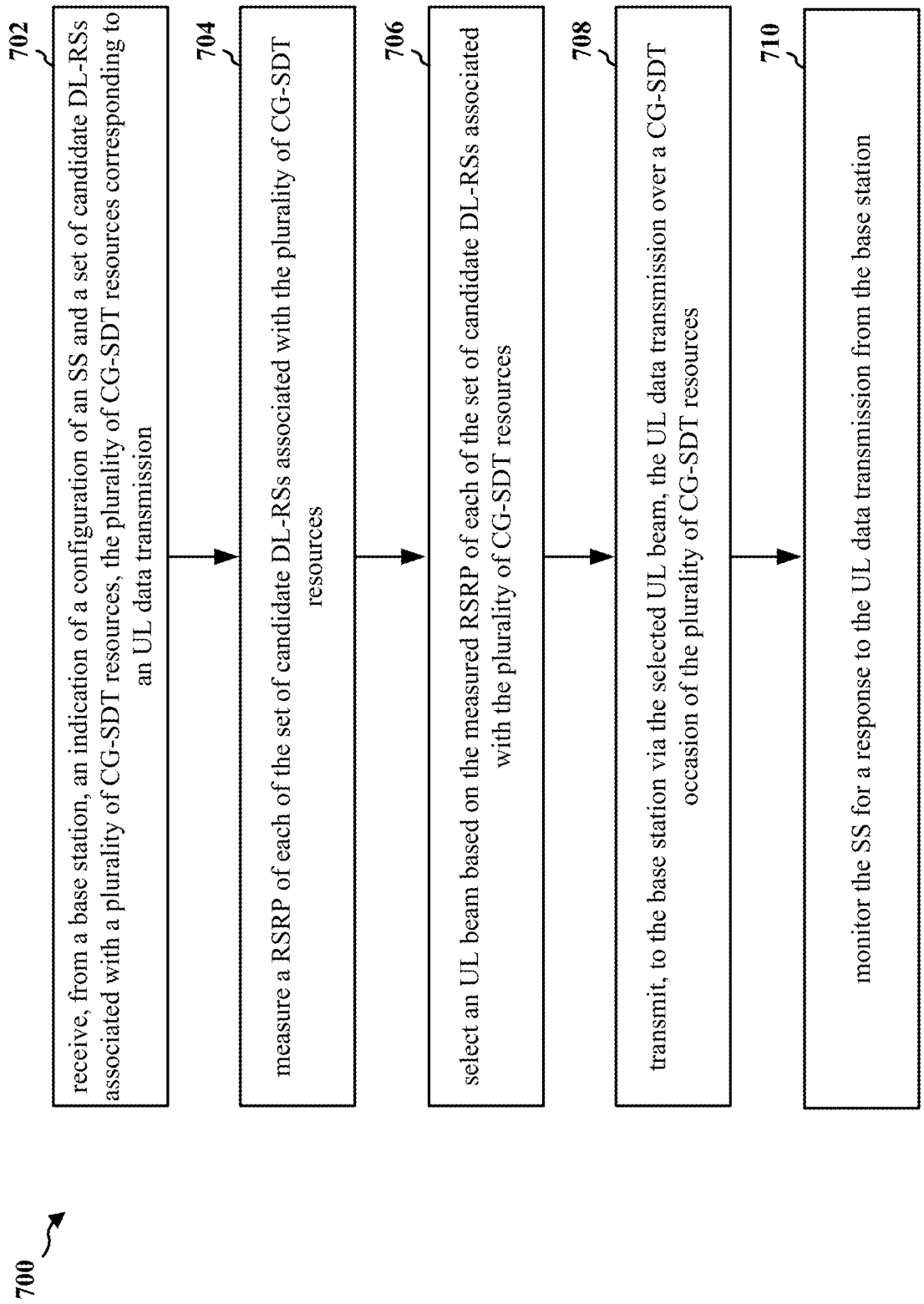
FIG. 7 is a flowchart of a method of wireless communication.

FIG. 7 is a flowchart 700 of a method of wireless communication. The method may be performed by a UE (e.g., the UE 104/350/602; the apparatus 1102). At 702, the UE may receive, from a base station, an indication of a configuration of an SS and a set of candidate DL-RSs associated with a plurality of CG-SDT resources. The plurality of CG-SDT resources may correspond to an UL data transmission. For example, 702 may be performed by the CG-SDT component 1140 in FIG. 11. Referring to FIG. 6, at 608, the UE 602 may receive, from a base station 604, an indication of a configuration of an SS and a set of candidate DL-RSs associated with a plurality of CG-SDT resources.

At 704, the UE may measure a RSRP of each of the set of candidate DL-RSs associated with the plurality of CG-SDT resources. For example, 704 may be performed by the CG-SDT component 1140 in FIG. 11. Referring to FIG. 6, at 612, the UE 602 may measure a RSRP of each of the set of candidate DL-RSs associated with the plurality of CG-SDT resources.

At 706, the UE may select an UL beam based on the measured RSRP of each of the set of candidate DL-RSs associated with the plurality of CG-SDT resources. For example, 706 may be performed by the CG-SDT component 1140 in FIG. 11.

Referring to FIG. 6, at 616, the UE 602 may select an UL beam based on the measured RSRP of each of the set of candidate DL-RSs associated with the plurality of CG-SDT resources.

At 708, the UE may transmit, to the base station via the selected UL beam, the UL data transmission over a CG-SDT occasion of the plurality of CG-SDT resources. For example, 708 may be performed by the CG-SDT component 1140 in FIG. 11. Referring to FIG. 6, at 618, the UE 602 may transmit, to the base station 604 via the selected UL beam, the UL data transmission over a CG-SDT occasion of the plurality of CG-SDT resources.

At 710, the UE may monitor the SS for a response to the UL data transmission from the base station. For example, 710 may be performed by the CG-SDT component 1140 in FIG. 11. Referring to FIG. 6, at 624, the UE 602 may monitor the SS for a response to the UL data transmission from the base station 604.

Figure 8:
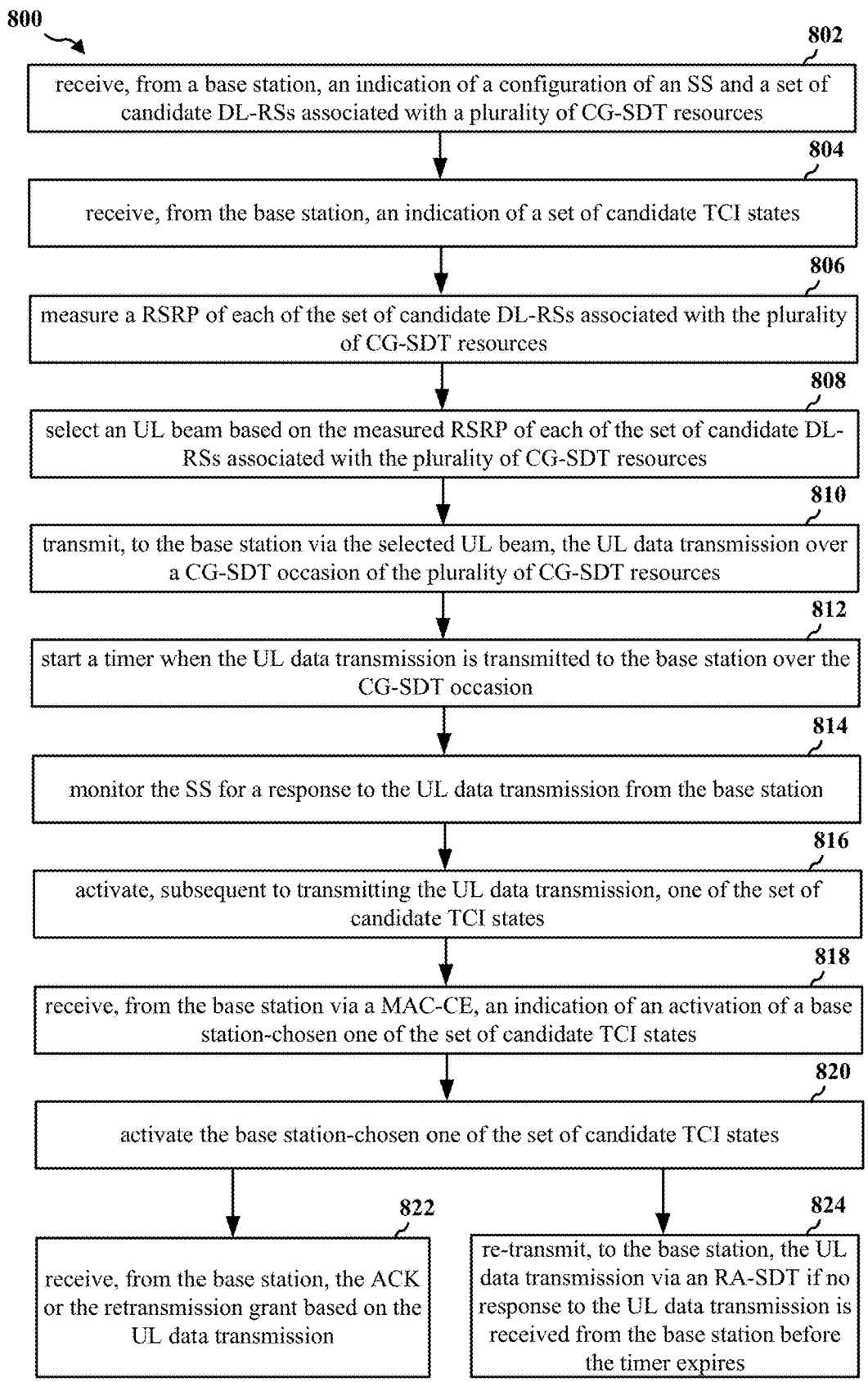
FIG. 8 is a flowchart of a method of wireless communication.

FIG. 8 is a flowchart 800 of a method of wireless communication. The method may be performed by a UE (e.g., the UE 104/350/602; the apparatus 1102). At 802, the UE may receive, from a base station, an indication of a configuration of an SS and a set of candidate DL-RSs associated with a plurality of CG-SDT resources. The plurality of CG-SDT resources may correspond to an UL data transmission. For example, 802 may be performed by the CG-SDT component 1140 in FIG. 11. Referring to FIG. 6, at 608, the UE 602 may receive, from a base station 604, an indication of a configuration of an SS and a set of candidate DL-RSs associated with a plurality of CG-SDT resources.

At 806, the UE may measure a RSRP of each of the set of candidate DL-RSs associated with the plurality of CG-SDT resources. For example, 806 may be performed by the CG-SDT component 1140 in FIG. 11. Referring to FIG. 6, at 612, the UE 602 may measure a RSRP of each of the set of candidate DL-RSs associated with the plurality of CG-SDT resources.

At 808, the UE may select an UL beam based on the measured RSRP of each of the set of candidate DL-RSs associated with the plurality of CG-SDT resources. For example, 808 may be performed by the CG-SDT component 1140 in FIG. 11. Referring to FIG. 6, at 616, the UE 602 may select an UL beam based on the measured RSRP of each of the set of candidate DL-RSs associated with the plurality of CG-SDT resources.

At 810, the UE may transmit, to the base station via the selected UL beam, the UL data transmission over a CG-SDT occasion of the plurality of CG-SDT resources. For example, 810 may be performed by the CG-SDT component 1140 in FIG. 11. Referring to FIG. 6, at 618, the UE 602 may transmit, to the base station 604 via the selected UL beam, the UL data transmission over a CG-SDT occasion of the plurality of CG-SDT resources.

At 814, the UE may monitor the SS for a response to the UL data transmission from the base station. For example, 814 may be performed by the CG-SDT component 1140 in FIG. 11. Referring to FIG. 6, at 624, the UE 602 may monitor the SS for a response to the UL data transmission from the base station 604.

In one configuration, the SS may be associated with a plurality of TCI states.

In one configuration, the configuration of the SS may be associated with the UE being released into an RRC Idle state or an RRC Inactive state.

In one configuration, the SS may be a CSS or a USS.

In one configuration, the SS may be a USS. At 804, the UE may receive, from the base station, an indication of a set of candidate TCI states. Each of the set of candidate TCI states may correspond to a respective one of the set of candidate DL-RSs. For example, 804 may be performed by the CG-SDT component 1140 in FIG. 11. Referring to FIG. 6, at 610, the UE 602 may receive, from the base station 604, an indication of a set of candidate TCI states. At 816, the UE may activate, subsequent to transmitting the UL data transmission, one of the set of candidate TCI states. The monitoring of the SS for the response to the UL data transmission from the base station may at least initially be based on the activated one of the set of candidate TCI states. For example, 816 may be performed by the CG-SDT component 1140 in FIG. 11. Referring to FIG. 6, at 626, the UE 602 may activate, subsequent to transmitting the UL data transmission, one of the set of candidate TCI states.

In one configuration, the CG-SDT occasion may correspond to a first DL-RS of the set of candidate DL-RSs. The activated one of the set of candidate TCI states may correspond to the first DL-RS.

In one configuration, the CG-SDT occasion may corresponds to a first DL-RS of the set of candidate DL-RSs. The activated one of the set of candidate TCI states may not correspond to the first DL-RS.

In one configuration, the UL data transmission may include a MAC-CE via which an indication of the activated one of the set of candidate TCI states is transmitted to the base station.

In one configuration, at 818, the UE may receive, from the base station via a MAC-CE based on the activated one of the set of candidate TCI states, an indication of an activation of a base station-chosen one of the set of candidate TCI states. For example, 818 may be performed by the CG-SDT component 1140 in FIG. 11. Referring to FIG. 6, at 628, the UE 602 may receive, from the base station 604 via a MAC-CE based on the activated one of the set of candidate TCI states, an indication of an activation of a base station-chosen one of the set of candidate TCI states. At 820, the UE may activate the base station-chosen one of the set of candidate TCI states. The monitoring of the SS for the response to the UL data transmission from the base station may subsequently be based on the base station-chosen one of the set of candidate TCI states. For example, 820 may be performed by the CG-SDT component 1140 in FIG. 11. Referring to FIG. 6, at 630, the UE 602 may activate the base station-chosen one of the set of candidate TCI states.

In one configuration, at 812, the UE may start a timer when the UL data transmission is transmitted to the base station over the CG-SDT occasion. For example, 812 may be performed by the CG-SDT component 1140 in FIG. 11. Referring to FIG. 6, at 620, the UE 602 may start a timer when the UL data transmission is transmitted to the base station over the CG-SDT occasion. At 824, the UE may re-transmit, to the base station, the UL data transmission via an RA-SDT if no response to the UL data transmission is received from the base station before the timer expires. For example, 824 may be performed by the CG-SDT component 1140 in FIG. 11. Referring to FIG. 6, at 634, the UE 602 may re-transmit, to the base station 604, the UL data transmission via an RA-SDT if no response to the UL data transmission is received from the base station before the timer expires.

In one configuration, the response to the UL data transmission may be an ACK or a retransmission grant.

Figure 9:
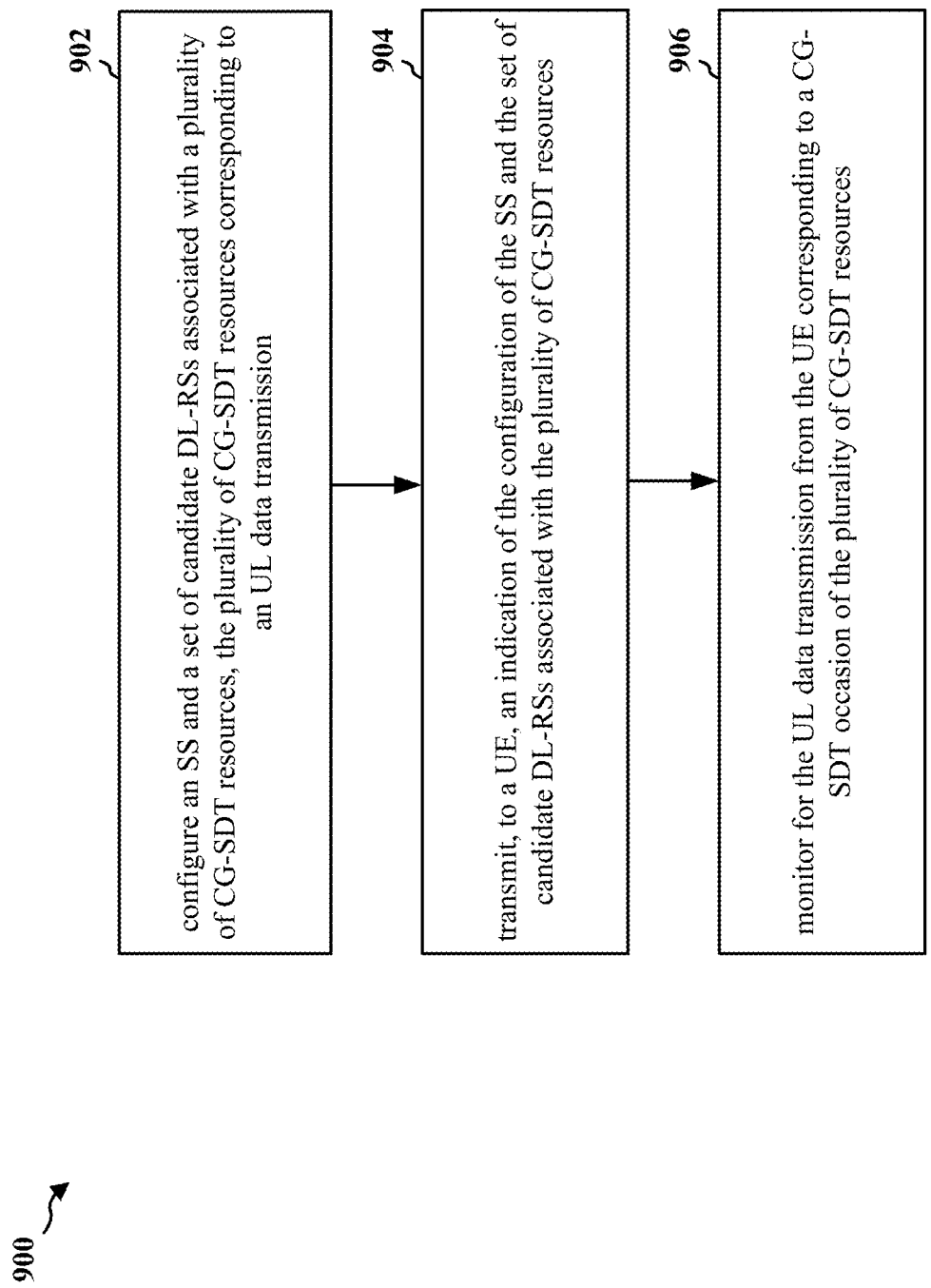
FIG. 9 is a flowchart of a method of wireless communication.

In one configuration, at 822, the UE may receive, from the base station, the ACK or the retransmission grant based on the UL data transmission. For example, 822 may be performed by the CG-SDT component 1140 in FIG. 11. Referring to FIG. 6, at 632, the UE 602 may receive, from the base station 604, the ACK or the retransmission grant based on the UL data transmission FIG. 9 is a flowchart 900 of a method of wireless communication. The method may be performed by a base station (e.g., the base station 102/180/310/604; the apparatus 1202). At 902, the base station may configure an SS and a set of candidate DL-RSs associated with a plurality of CG-SDT resources. The plurality of CG-SDT resources may correspond to an UL data transmission. For example, 902 may be performed by the CG-SDT component 1240 in FIG. 12. Referring to FIG. 6, at 606, the base station 604 may configure an SS and a set of candidate DL-RSs associated with a plurality of CG-SDT resources.

At 904, the base station may transmit, to a UE, an indication of the configuration of the SS and the set of candidate DL-RSs associated with the plurality of CG-SDT resources. For example, 904 may be performed by the CG-SDT component 1240 in FIG. 12. Referring to FIG. 6, at 608, the base station 604 may transmit, to a UE 602, an indication of the configuration of the SS and the set of candidate DL-RSs associated with the plurality of CG-SDT resources.

At 906, the base station may monitor for the UL data transmission from the UE corresponding to a CG-SDT occasion of the plurality of CG-SDT resources. For example, 906 may be performed by the CG-SDT component 1240 in FIG. 12. Referring to FIG. 6, at 614, the base station 604 may monitor for the UL data transmission from the UE 602 corresponding to a CG-SDT occasion of the plurality of CG-SDT resources.

Figure 10:
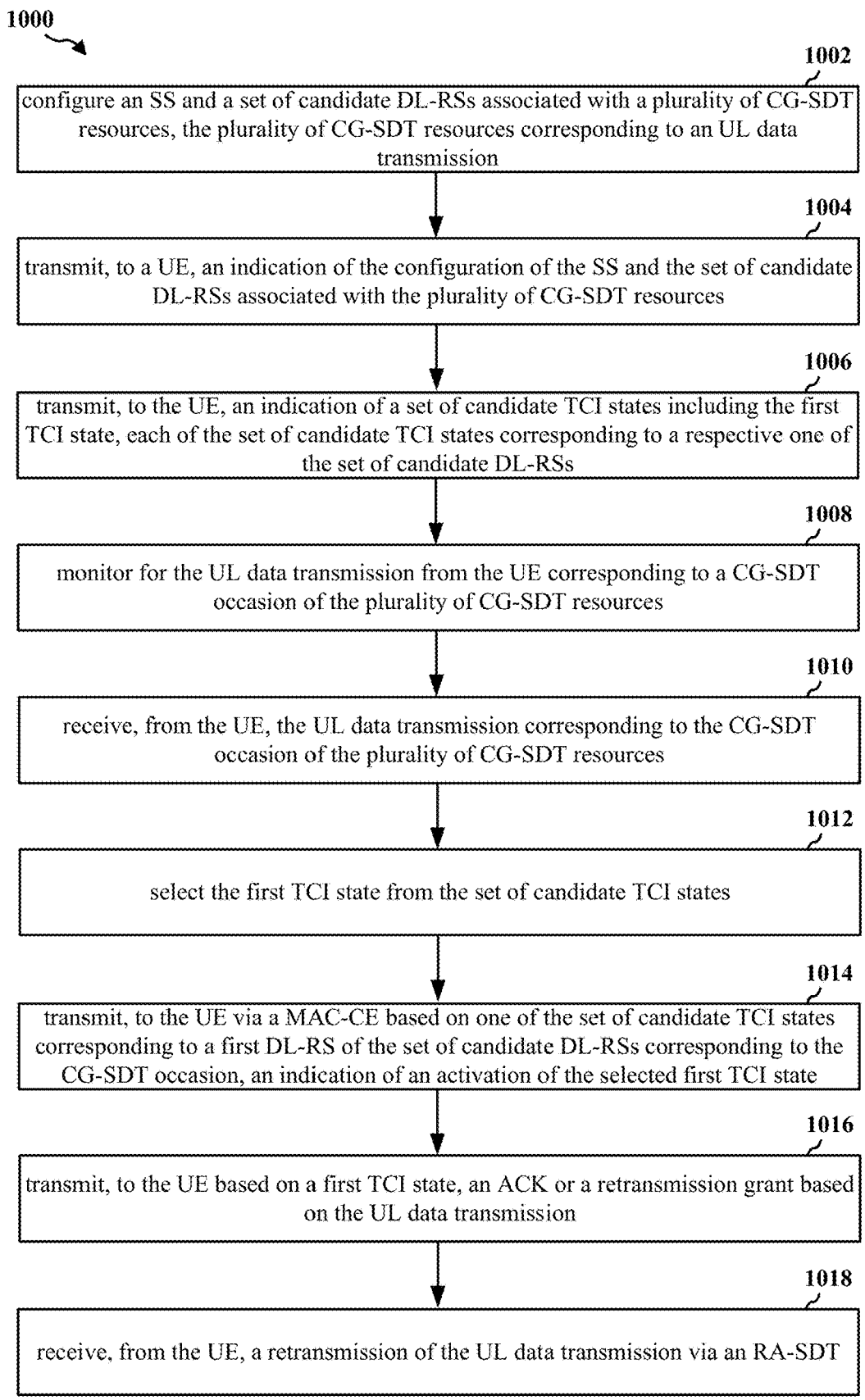
FIG. 10 is a flowchart of a method of wireless communication.

FIG. 10 is a flowchart 1000 of a method of wireless communication. The method may be performed by a base station (e.g., the base station 102/180/310/604; the apparatus 1202). At 1002, the base station may configure an SS and a set of candidate DL-RSs associated with a plurality of CG-SDT resources. The plurality of CG-SDT resources may correspond to an UL data transmission. For example, 1002 may be performed by the CG-SDT component 1240 in FIG. 12. Referring to FIG. 6, at 606, the base station 604 may configure an SS and a set of candidate DL-RSs associated with a plurality of CG-SDT resources.

At 1004, the base station may transmit, to a UE, an indication of the configuration of the SS and the set of candidate DL-RSs associated with the plurality of CG-SDT resources. For example, 1004 may be performed by the CG-SDT component 1240 in FIG. 12. Referring to FIG. 6, at 608, the base station 604 may transmit, to a UE 602, an indication of the configuration of the SS and the set of candidate DL-RSs associated with the plurality of CG-SDT resources.

At 1008, the base station may monitor for the UL data transmission from the UE corresponding to a CG-SDT occasion of the plurality of CG-SDT resources. For example, 1008 may be performed by the CG-SDT component 1240 in FIG. 12. Referring to FIG. 6, at 614, the base station 604 may monitor for the UL data transmission from the UE 602 corresponding to a CG-SDT occasion of the plurality of CG-SDT resources.

In one configuration, the SS may be associated with a plurality of TCI states.

In one configuration, the configuration of the SS may be associated with releasing the UE into an RRC Idle state or an RRC Inactive state.

In one configuration, at 1010, the base station may receive, from the UE, the UL data transmission corresponding to the CG-SDT occasion of the plurality of CG-SDT resources. For example, 1010 may be performed by the CG-SDT component 1240 in FIG. 12. Referring to FIG. 6, at 618, the base station 604 may receive, from the UE 602, the UL data transmission corresponding to the CG-SDT occasion of the plurality of CG-SDT resources.

In one configuration, at 1016, the base station may transmit, to the UE based on a first TCI state, an ACK or a retransmission grant based on the UL data transmission. For example, 1016 may be performed by the CG-SDT component 1240 in FIG. 12. Referring to FIG. 6, at 632, the base station 604 may transmit, to the UE 602 based on a first TCI state, an ACK or a retransmission grant based on the UL data transmission.

In one configuration, the SS may be a CSS or a USS.

In one configuration, the SS may be a USS. At 1006, the base station may transmit, to the UE, an indication of a set of candidate TCI states including the first TCI state. Each of the set of candidate TCI states may correspond to a respective one of the set of candidate DL-RSs. For example, 1006 may be performed by the CG-SDT component 1240 in FIG. 12. Referring to FIG. 6, at 610, the base station 604 may transmit, to the UE 602, an indication of a set of candidate TCI states including the first TCI state.

In one configuration, the CG-SDT occasion may correspond to a first DL-RS of the set of candidate DL-RSs. The first TCI state may correspond to the first DL-RS.

In one configuration, the CG-SDT occasion may correspond to a first DL-RS of the set of candidate DL-RSs. The first TCI state may not correspond to the first DL-RS.

In one configuration, the UL data transmission may include a MAC-CE via which an indication of the first TCI state is received from the UE.

In one configuration, at 1012, the base station may select the first TCI state from the set of candidate TCI states. For example, 1012 may be performed by the CG-SDT component 1240 in FIG. 12. Referring to FIG. 6, at 622, the base station 604 may select the first TCI state from the set of candidate TCI states. At 1014, the base station may transmit, to the UE via a MAC-CE based on one of the set of candidate TCI states corresponding to a first DL-RS of the set of candidate DL-RSs corresponding to the CG-SDT occasion, an indication of an activation of the selected first TCI state. For example, 1014 may be performed by the CG-SDT component 1240 in FIG. 12. Referring to FIG. 6, at 628, the base station 604 may transmit, to the UE 602 via a MAC-CE based on one of the set of candidate TCI states corresponding to a first DL-RS of the set of candidate DL-RSs corresponding to the CG-SDT occasion, an indication of an activation of the selected first TCI state.

In one configuration, at 1018, the base station may receive, from the UE, a retransmission of the UL data transmission via an RA-SDT. The retransmission via the RA-SDT may be based on a timer. For example, 1018 may be performed by the CG-SDT component 1240 in FIG. 12. Referring to FIG. 6, at 634, the base station 604 may receive, from the UE 602, a retransmission of the UL data transmission via an RA-SDT.

Figure 11:
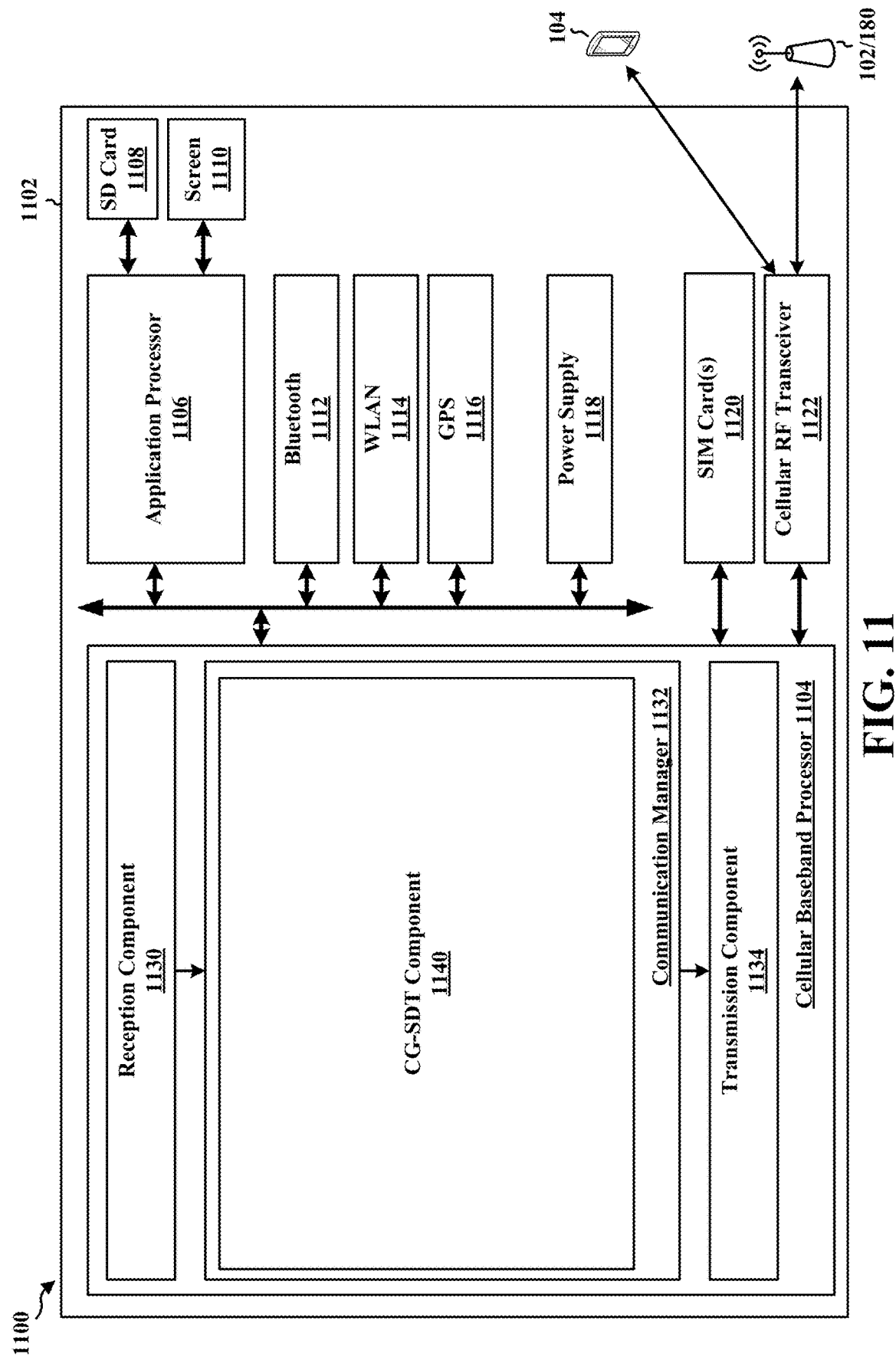
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes a CG-SDT component 1140 that may be configured to receive, from a base station, an indication of a configuration of an SS and a set of candidate DL-RSs associated with a plurality of CG-SDT resources, e.g., as described in connection with 702 in FIG. 7 and 802 in FIG. 8. The CG-SDT component 1140 may be configured to receive, from the base station, an indication of a set of candidate TCI states, e.g., as described in connection with 804 in FIG. 8. The CG-SDT component 1140 may be configured to measure a RSRP of each of the set of candidate DL-RSs associated with the plurality of CG-SDT resources, e.g., as described in connection with 704 in FIG. 7 and 806 in FIG. 8. The CG-SDT component 1140 may be configured to select an UL beam based on the measured RSRP of each of the set of candidate DL-RSs associated with the plurality of CG-SDT resources, e.g., as described in connection with 706 in FIG. 7 and 808 in FIG. 8. The CG-SDT component 1140 may be configured to transmit, to the base station via the selected UL beam, the UL data transmission over a CG-SDT occasion of the plurality of CG-SDT resources, e.g., as described in connection with 708 in FIG. 7 and 810 in FIG. 8. The CG-SDT component 1140 may be configured to start a timer when the UL data transmission is transmitted to the base station over the CG-SDT occasion, e.g., as described in connection with 812 in FIG. 8. The CG-SDT component 1140 may be configured to monitor the SS for a response to the UL data transmission from the base station, e.g., as described in connection with 710 in FIG. 7 and 814 in FIG. 8. The CG-SDT component 1140 may be configured to activate, subsequent to transmitting the UL data transmission, one of the set of candidate TCI states, e.g., as described in connection with 816 in FIG. 8. The CG-SDT component 1140 may be configured to receive, from the base station via a MAC-CE based on the activated one of the set of candidate TCI states, an indication of an activation of a base station-chosen one of the set of candidate TCI states, e.g., as described in connection with 818 in FIG. 8. The CG-SDT component 1140 may be configured to activate the base station-chosen one of the set of candidate TCI states, e.g., as described in connection with 820 in FIG. 8. The CG-SDT component 1140 may be configured to receive, from the base station, the ACK or the retransmission grant based on the UL data transmission, e.g., as described in connection with 822 in FIG. 8. The CG-SDT component 1140 may be configured to re-transmit, to the base station, the UL data transmission via an RA-SDT if no response to the UL data transmission is received from the base station before the timer expires, e.g., as described in connection with 824 in FIG. 8.

The apparatus may include additional components that perform each of the blocks of the algorithm in the flowcharts of FIGS. 6-8. As such, each block in the flowcharts of FIGS. 6-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, includes means for receiving, from a base station, an indication of a configuration of an SS and a set of candidate DL-RSs associated with a plurality of CG-SDT resources, the plurality of CG-SDT resources corresponding to an UL data transmission. The apparatus 1102 may include means for measuring a RSRP of each of the set of candidate DL-RSs associated with the plurality of CG-SDT resources. The apparatus 1102 may include means for selecting an UL beam based on the measured RSRP of each of the set of candidate DL-RSs associated with the plurality of CG-SDT resources. The apparatus 1102 may include means for transmitting, to the base station via the selected UL beam, the UL data transmission over a CG-SDT occasion of the plurality of CG-SDT resources. The apparatus 1102 may include means for monitoring the SS for a response to the UL data transmission from the base station.

In one configuration, the SS may be associated with a plurality of TCI states. In one configuration, the configuration of the SS may be associated with the UE being released into an RRC Idle state or an RRC Inactive state. In one configuration, the SS may be a CSS or a USS. In one configuration, the SS may be a USS. The apparatus 1102 may include means for receiving, from the base station, an indication of a set of candidate TCI states, each of the set of candidate TCI states corresponding to a respective one of the set of candidate DL-RSs. The apparatus 1102 may include means for activating, subsequent to transmitting the UL data transmission, one of the set of candidate TCI states. The monitoring of the SS for the response to the UL data transmission from the base station may be at least initially based on the activated one of the set of candidate TCI states.

In one configuration, the CG-SDT occasion may correspond to a first DL-RS of the set of candidate DL-RSs. The activated one of the set of candidate TCI states may correspond to the first DL-RS. In one configuration, the CG-SDT occasion may correspond to a first DL-RS of the set of candidate DL-RSs. The activated one of the set of candidate TCI states may not correspond to the first DL-RS. In one configuration, the UL data transmission may include a MAC-CE via which an indication of the activated one of the set of candidate TCI states is transmitted to the base station. In one configuration, the apparatus 1102 may include means for receiving, from the base station via a MAC-CE based on the activated one of the set of candidate TCI states, an indication of an activation of a base station-chosen one of the set of candidate TCI states. The apparatus 1102 may include means for activating the base station-chosen one of the set of candidate TCI states. The monitoring of the SS for the response to the UL data transmission from the base station may be subsequently based on the base station-chosen one of the set of candidate TCI states. In one configuration, the apparatus 1102 may include means for starting a timer when the UL data transmission is transmitted to the base station over the CG-SDT occasion. The apparatus 1102 may include means for re-transmitting, to the base station, the UL data transmission via an RA-SDT if no response to the UL data transmission is received from the base station before the timer expires. In one configuration, the response to the UL data transmission may be an ACK or a retransmission grant. In one configuration, the apparatus 1102 may include means for receiving, from the base station, the ACK or the retransmission grant based on the UL data transmission.

The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
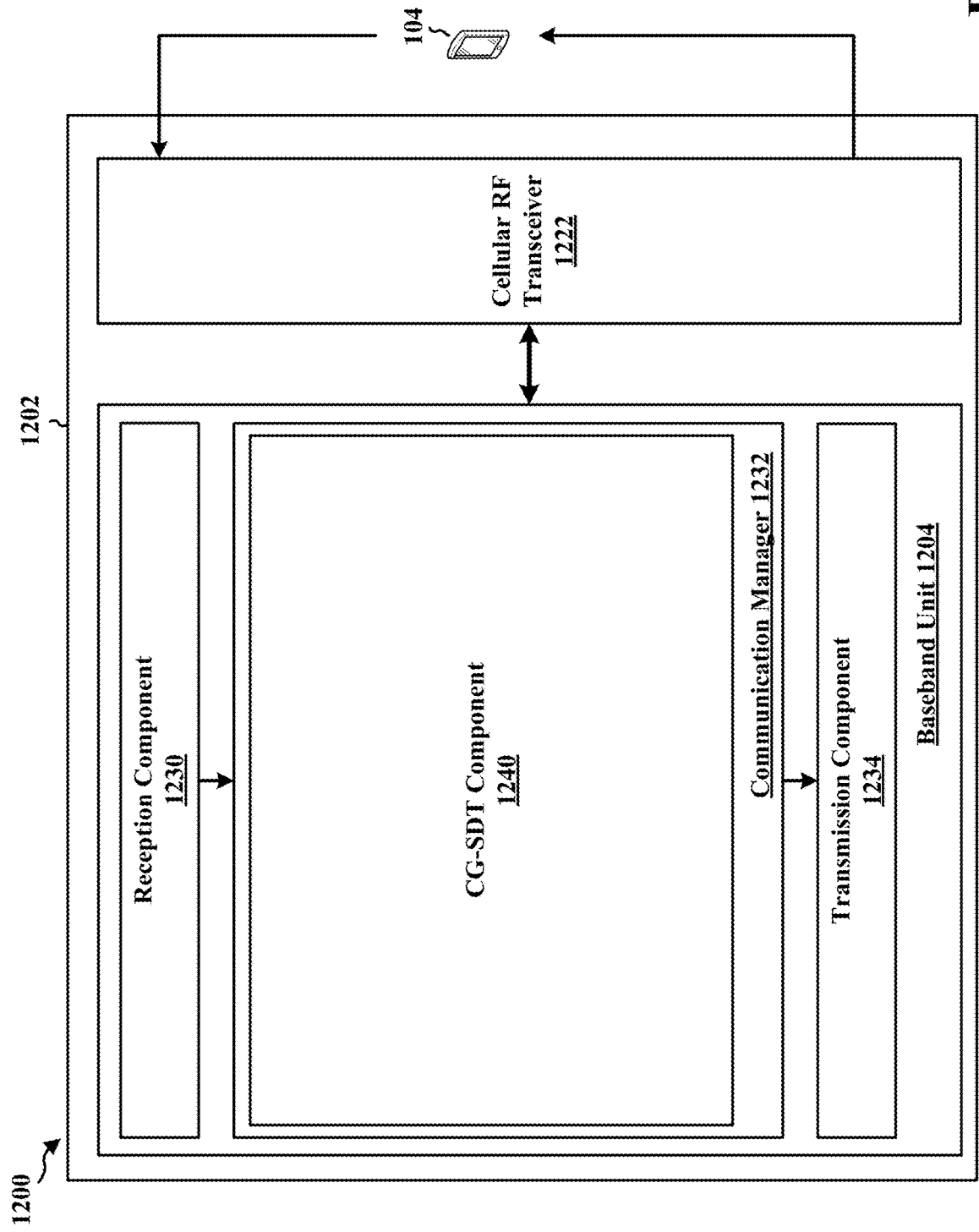
FIG. 12 is a diagram illustrating an example of a hardware implementation for an example apparatus.

FIG. 12 is a diagram 1200 illustrating an example of a hardware implementation for an apparatus 1202. The apparatus 1202 may be a base station, a component of a base station, or may implement base station functionality. In some aspects, the apparatus 1202 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 includes a CG-SDT component 1240 that may be configured to configure an SS and a set of candidate DL-RSs associated with a plurality of CG-SDT resources, e.g., as described in connection with 902 in FIG. 9 and 1002 in FIG. 10. The CG-SDT component 1240 may be configured to transmit, to a UE, an indication of the configuration of the SS and the set of candidate DL-RSs associated with the plurality of CG-SDT resources, e.g., as described in connection with 904 in FIG. 9 and 1004 in FIG. 10. The CG-SDT component 1240 may be configured to transmit, to the UE, an indication of a set of candidate TCI states including the first TCI state, e.g., as described in connection with 1006 in FIG. 10. The CG-SDT component 1240 may be configured to monitor for the UL data transmission from the UE corresponding to a CG-SDT occasion of the plurality of CG-SDT resources, e.g., as described in connection with 906 in FIG. 9 and 1008 in FIG. 10. The CG-SDT component 1240 may be configured to receive, from the UE, the UL data transmission corresponding to the CG-SDT occasion of the plurality of CG-SDT resources, e.g., as described in connection with 1010 in FIG. 10. The CG-SDT component 1240 may be configured to select the first TCI state from the set of candidate TCI states, e.g., as described in connection with 1012 in FIG. 10. The CG-SDT component 1240 may be configured to transmit, to the UE via a MAC-CE based on one of the set of candidate TCI states corresponding to a first DL-RS of the set of candidate DL-RSs corresponding to the CG-SDT occasion, an indication of an activation of the selected first TCI state, e.g., as described in connection with 1014 in FIG. 10. The CG-SDT component 1240 may be configured to transmit, to the UE based on a first TCI state, an ACK or a retransmission grant based on the UL data transmission, e.g., as described in connection with 1016 in FIG. 10. The CG-SDT component 1240 may be configured to receive, from the UE, a retransmission of the UL data transmission via an RA-SDT, e.g., as described in connection with 1018 in FIG. 10.

The apparatus may include additional components that perform each of the blocks of the algorithm in the flowcharts of FIGS. 6, 9, and 10. As such, each block in the flowcharts of FIGS. 6, 9, and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for configuring an SS and a set of candidate DL-RSs associated with a plurality of CG-SDT resources, the plurality of CG-SDT resources corresponding to an UL data transmission. The apparatus 1202 may include means for transmitting, to a UE, an indication of the configuration of the SS and the set of candidate DL-RSs associated with the plurality of CG-SDT resources. The apparatus 1202 may include means for monitoring for the UL data transmission from the UE corresponding to a CG-SDT occasion of the plurality of CG-SDT resources.

In one configuration, the SS may be associated with a plurality of TCI states. In one configuration, the configuration of the SS may be associated with releasing the UE into an RRC Idle state or an RRC Inactive state. In one configuration, the apparatus 1202 may include means for receiving, from the UE, the UL data transmission corresponding to the CG-SDT occasion of the plurality of CG-SDT resources. In one configuration, the apparatus 1202 may include means for transmitting, to the UE based on a first TCI state, an ACK or a retransmission grant based on the UL data transmission. In one configuration, the SS may be a CSS or a USS. In one configuration, the SS may be a USS. The apparatus 1202 may include means for transmitting, to the UE, an indication of a set of candidate TCI states including the first TCI state, each of the set of candidate TCI states corresponding to a respective one of the set of candidate DL-RSs. In one configuration, the CG-SDT occasion may correspond to a first DL-RS of the set of candidate DL-RSs. The first TCI state may correspond to the first DL-RS. In one configuration, the CG-SDT occasion may correspond to a first DL-RS of the set of candidate DL-RSs. The first TCI state may not correspond to the first DL-RS. In one configuration, the UL data transmission may include a MAC-CE via which an indication of the first TCI state is received from the UE. In one configuration, the apparatus 1202 may include means for selecting the first TCI state from the set of candidate TCI states. The apparatus 1202 may include means for transmitting, to the UE via a MAC-CE based on one of the set of candidate TCI states corresponding to a first DL-RS of the set of candidate DL-RSs corresponding to the CG-SDT occasion, an indication of an activation of the selected first TCI state. In one configuration, the apparatus 1202 may include means for receiving, from the UE, a retransmission of the UL data transmission via an RA-SDT. The retransmission via the RA-SDT may be based on a timer.

The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

According to aspects described herein, the UE may receive, from a base station, an indication of a configuration of an SS and a set of candidate DL-RSs associated with a plurality of CG-SDT resources. The base station may monitor for the UL data transmission from the UE corresponding to a CG-SDT occasion of the CG-SDT resources. The UE may measure a RSRP of each of the set of candidate DL-RSs associated with the CG-SDT resources. The UE may select an UL beam based on the measured RSRP of each of the set of candidate DL-RSs associated with the CG-SDT resources. The UE may transmit, to the base station via the selected UL beam, the UL data transmission over a CG-SDT occasion of the plurality of CG-SDT resources. The UE may monitor the SS for a response to the UL data transmission from the base station. The SS configured for the DL response to the CG-SDT transmission may be either a CSS or a USS. Multiple methods for selecting the TCI state based on which the DL response is transmitted have been described. Depending on the particular deployment and network condition, a suitable SS configuration may be utilized for the transmission of the DL response to the CG-SDT transmission.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to receive, from a base station, an indication of a configuration of an SS and a set of candidate DL-RSs associated with a plurality of CG-SDT resources, the plurality of CG-SDT resources corresponding to an UL data transmission; measure a RSRP of each of the set of candidate DL-RSs associated with the plurality of CG-SDT resources; select an UL beam based on the measured RSRP of each of the set of candidate DL-RSs associated with the plurality of CG-SDT resources; transmit, to the base station via the selected UL beam, the UL data transmission over a CG-SDT occasion of the plurality of CG-SDT resources; and monitor the SS for a response to the UL data transmission from the base station.

Aspect 2 is the apparatus of aspect 1, where the SS is associated with a plurality of TCI states.

Aspect 3 is the apparatus of any of aspects 1 and 2, where the configuration of the SS is associated with the UE being released into an RRC Idle state or an RRC Inactive state.

Aspect 4 is the apparatus of any of aspects 1 to 3, where the SS is a CSS or a USS.

Aspect 5 is the apparatus of aspect 4, where the SS is a USS, and the at least one processor is further configured to: receive, from the base station, an indication of a set of candidate TCI states, each of the set of candidate TCI states corresponding to a respective one of the set of candidate DL-RSs; and activate, subsequent to transmitting the UL data transmission, one of the set of candidate TCI states, where the monitoring of the SS for the response to the UL data transmission from the base station is at least initially based on the activated one of the set of candidate TCI states.

Aspect 6 is the apparatus of aspect 5, where the CG-SDT occasion corresponds to a first DL-RS of the set of candidate DL-RSs, and the activated one of the set of candidate TCI states corresponds to the first DL-RS.

Aspect 7 is the apparatus of aspect 5, where the CG-SDT occasion corresponds to a first DL-RS of the set of candidate DL-RSs, and the activated one of the set of candidate TCI states does not correspond to the first DL-RS.

Aspect 8 is the apparatus of any of aspects 5 and 7, where the UL data transmission includes a MAC-CE via which an indication of the activated one of the set of candidate TCI states is transmitted to the base station.

Aspect 9 is the apparatus of any of aspects 5 and 7, the at least one processor being further configured to: receive, from the base station via a MAC-CE based on the activated one of the set of candidate TCI states, an indication of an activation of a base station-chosen one of the set of candidate TCI states; and activate the base station-chosen one of the set of candidate TCI states, where the monitoring of the SS for the response to the UL data transmission from the base station is subsequently based on the base station-chosen one of the set of candidate TCI states.

Aspect 10 is the apparatus of any of aspects 5 to 9, the at least one processor being further configured to: start a timer when the UL data transmission is transmitted to the base station over the CG-SDT occasion; and re-transmit, to the base station, the UL data transmission via an RA-SDT if no response to the UL data transmission is received from the base station before the timer expires.

Aspect 11 is the apparatus of any of aspects 1 to 10, where the response to the UL data transmission is an ACK or a retransmission grant.

Aspect 12 is the apparatus of aspect 11, the at least one processor being further configured to: receive, from the base station, the ACK or the retransmission grant based on the UL data transmission.

Aspect 13 is the apparatus of any of aspects 1 to 12, further including a transceiver coupled to the at least one processor.

Aspect 14 is an apparatus for wireless communication at a base station including at least one processor coupled to a memory and configured to configure an SS and a set of candidate DL-RSs associated with a plurality of CG-SDT resources, the plurality of CG-SDT resources corresponding to an UL data transmission; transmit, to a UE, an indication of the configuration of the SS and the set of candidate DL-RSs associated with the plurality of CG-SDT resources; and monitor for the UL data transmission from the UE corresponding to a CG-SDT occasion of the plurality of CG-SDT resources.

Aspect 15 is the apparatus of aspect 14, where the SS is associated with a plurality of TCI states.

Aspect 16 is the apparatus of any of aspects 14 and 15, where the configuration of the SS is associated with releasing the UE into an RRC Idle state or an RRC Inactive state.

Aspect 17 is the apparatus of any of aspects 14 to 16, the at least one processor being further configured to: receive, from the UE, the UL data transmission corresponding to the CG-SDT occasion of the plurality of CG-SDT resources.

Aspect 18 is the apparatus of aspect 17, the at least one processor being further configured to: transmit, to the UE based on a first TCI state, an ACK or a retransmission grant based on the UL data transmission.

Aspect 19 is the apparatus of aspect 18, where the SS is a CSS or a USS.

Aspect 20 is the apparatus of aspect 19, where the SS is a USS, and the at least one processor is further configured to: transmit, to the UE, an indication of a set of candidate TCI states including the first TCI state, each of the set of candidate TCI states corresponding to a respective one of the set of candidate DL-RSs.

Aspect 21 is the apparatus of aspect 20, where the CG-SDT occasion corresponds to a first DL-RS of the set of candidate DL-RSs, and the first TCI state corresponds to the first DL-RS.

Aspect 22 is the apparatus of aspect 20, where the CG-SDT occasion corresponds to a first DL-RS of the set of candidate DL-RSs, and the first TCI state does not correspond to the first DL-RS.

Aspect 23 is the apparatus of any of aspects 20 and 22, where the UL data transmission includes a MAC-CE via which an indication of the first TCI state is received from the UE.

Aspect 24 is the apparatus of any of aspects 20 and 22, the at least one processor being further configured to: select the first TCI state from the set of candidate TCI states; and transmit, to the UE via a MAC-CE based on one of the set of candidate TCI states corresponding to a first DL-RS of the set of candidate DL-RSs corresponding to the CG-SDT occasion, an indication of an activation of the selected first TCI state.

Aspect 25 is the apparatus of any of aspects 14 to 24, the at least one processor being further configured to: receive, from the UE, a retransmission of the UL data transmission via an RA-SDT, where the retransmission via the RA-SDT is based on a timer.

Aspect 26 is the apparatus of any of aspects 14 to 25, further including a transceiver coupled to the at least one processor.

Aspect 27 is a method of wireless communication for implementing any of aspects 1 to 26.

Aspect 28 is an apparatus for wireless communication including means for implementing any of aspects 1 to 26.

Aspect 29 is a computer-readable medium storing computer executable code, where the code when executed by a processor causes the processor to implement any of aspects 1 to 26.

What is claimed is:

1. A user equipment (UE) for wireless communication, comprising:
   a memory; and
   at least one processor coupled to the memory, wherein the at least one processor is configured to:
   receive an indication of a configuration of a search space (SS) and a set of one or more candidate downlink reference signals (DL-RSs) associated with a plurality of configured grant (CG) small data transmission (SDT) (CG-SDT) resources, the plurality of CG-SDT resources corresponding to an uplink (UL) data transmission;
   measure a reference signal received power (RSRP) of each respective candidate DL-RS of the set of one or more candidate DL-RSs associated with the plurality of CG-SDT resources;
   transmit, based on the measurement of the RSRP of each respective candidate DL- RS of the set of one or more candidate DL-RSs, the UL data transmission over a CG-SDT occasion of the plurality of CG-SDT resources; and
   monitor the SS for a response to the UL data transmission.

2. The UE of claim 1, wherein the SS is associated with a plurality of transmission configuration indicator (TCI) states.

3. The UE of claim 1, wherein the indication of the configuration of the SS is associated with the UE being released into a radio resource control (RRC) idle state or an RRC inactive state.

4. The UE of claim 1, wherein the SS is a common SS (CSS) or a UE-specific SS (USS).

5. The UE of claim 4, wherein the SS is the USS, and the at least one processor is configured to:
   receive an indication of a set of one or more candidate transmission configuration indicator (TCI) states, wherein each respective candidate TCI state of the set of one or more candidate TCI states corresponds to a respective candidate DL-RS of the set of one or more candidate DL-RSs; and
   activate, after transmission of the UL data transmission, a first TCI state of the set of one or more candidate TCI states,
   wherein, to monitor the SS for the response to the UL data transmission, the at least one processor is configured to monitor the SS for the response to the UL data transmission based on the activated first TCI state.

6. The UE of claim 5, wherein the CG-SDT occasion corresponds to a first DL-RS of the set of one or more candidate DL-RSs, and the activated first TCI state corresponds to the first DL-RS.

7. The UE of claim 5, wherein the CG-SDT occasion corresponds to a first DL-RS of the set of one or more candidate DL-RSs, and the activated first TCI state does not correspond to the first DL-RS.

8. The UE of claim 5, wherein the UL data transmission includes a medium access control (MAC)—control element (CE) (MAC-CE), wherein the MAC-CE includes an indication of the activated first TCI state.

9. The UE of claim 5, wherein the at least one processor is configured to:
   receive, via a medium access control (MAC)—control element (CE) (MAC-CE) based on the activated first TCI state, an indication for activation of a second TCI state of the set of one or more candidate TCI states; and
   activate the second TCI state, wherein, to monitor the SS for the response to the UL data transmission, the at least one processor is configured to monitor the SS for the response to the UL data transmission based on the second TCI state.

10. The UE of claim 5, wherein the at least one processor is configured to:
    start a timer when the UL data transmission is transmitted over the CG-SDT occasion; and re-transmit the UL data transmission via a random access (RA)—SDT (RA-SDT) if no response to the UL data transmission is received before the timer expires.

11. The UE of claim 1, wherein the response to the UL data transmission is an acknowledgement (ACK) or a retransmission grant.

12. The UE of claim 11, wherein the at least one processor is configured to:
receive the ACK or the retransmission grant based on the UL data transmission.

13. The UE of claim 1, further comprising a transceiver coupled to the at least one processor.

14. A method of wireless communication performed by a user equipment (UE), comprising:
receiving, an indication of a configuration of a search space (SS) and a set of one or more candidate downlink reference signals (DL-RSs) associated with a plurality of configured grant (CG) small data transmission (SDT) (CG-SDT) resources, the plurality of CG-SDT resources corresponding to an uplink (UL) data transmission;
measuring a reference signal received power (RSRP) of each respective candidate DL-RS of the set of one or more candidate DL-RSs associated with the plurality of CG-SDT resources;
transmitting, based on the measurement of the RSRP of each respective candidate DL-RS of the set of one or more candidate DL-RSs, the UL data transmission over a CG-SDT occasion of the plurality of CG-SDT resources; and
monitoring the SS for a response to the UL data transmission.

15. The method of claim 14, wherein the SS is associated with a plurality of transmission configuration indicator (TCI) states.

16. An apparatus for wireless communication, comprising:
a memory; and
at least one processor coupled to the memory, wherein the at least one processor is configured to:
configure a search space (SS) and a set of one or more candidate downlink reference signals (DL-RSs) associated with a plurality of configured grant (CG) small data transmission (SDT) (CG-SDT) resources, the plurality of CG-SDT resources corresponding to an uplink (UL) data transmission;
transmit, to a UE, an indication of the configuration of the SS and the set of one or more candidate DL-RSs associated with the plurality of CG-SDT resources, wherein the SS is a UE-specific SS (USS);
transmit, to the UE, an indication of a set of one or more candidate transmission configuration indicator (TCI) states including a first TCI state, wherein each respective candidate TCI state of the set of one or more candidate TCI states corresponds to a respective candidate DL-RS of the set of one or more candidate DL-RSs; and
monitor for the UL data transmission from the UE corresponding to a CG-SDT occasion of the plurality of CG-SDT resources.

17. The apparatus of claim 16, wherein the SS is associated with a plurality of transmission configuration indicator (TCI) states.

18. The apparatus of claim 16, wherein the indication of the configuration of the SS is associated with releasing the UE into a radio resource control (RRC) idle state or an RRC inactive state.

19. The apparatus of claim 16, wherein the at least one processor is configured to:
receive, from the UE, the UL data transmission corresponding to the CG-SDT occasion of the plurality of CG-SDT resources.

20. The apparatus of claim 19, wherein the at least one processor is configured to:
transmit, to the UE based on a first transmission configuration indicator (TCI) state, an acknowledgement (ACK) or a retransmission grant based on the UL data transmission.

21. The apparatus of claim 16, wherein the CG-SDT occasion corresponds to a first DL-RS of the set of one or more candidate DL-RSs, and the first TCI state corresponds to the first DL-RS.

22. The apparatus of claim 16, wherein the CG-SDT occasion corresponds to a first DL-RS of the set of one or more candidate DL-RSs, and the first TCI state does not correspond to the first DL-RS.

23. The apparatus of claim 16, wherein the UL data transmission includes a medium access control (MAC)—control element (CE) (MAC-CE), wherein the MAC-CE includes an indication of the first TCI state.

24. The apparatus of claim 16, wherein the at least one processor is configured to:
select the first TCI state from the set of one or more candidate TCI states; and
transmit, to the UE via a medium access control (MAC)—control element (CE) (MAC-CE) based on one TCI state of the set of one or more candidate TCI states corresponding to a first DL-RS of the set of one or more candidate DL-RSs corresponding to the CG-SDT occasion, an indication for activation of the selected first TCI state.

25. The apparatus of claim 16, wherein the at least one processor is configured to:
receive, from the UE, a retransmission of the UL data transmission via a random access (RA)—SDT (RA-SDT),
wherein the retransmission via the RA-SDT is based on a timer.

26. The apparatus of claim 16, further comprising a transceiver coupled to the at least one processor.

27. A method of wireless communication, comprising:
configuring a search space (SS) and a set of one or more candidate downlink reference signals (DL-RSs) associated with a plurality of configured grant (CG) small data transmission (SDT) (CG-SDT) resources, the plurality of CG-SDT resources corresponding to an uplink (UL) data transmission;
transmitting, to a UE, an indication of the configuration of the SS and the set of one or more candidate DL-RSs associated with the plurality of CG-SDT resources, wherein the SS is a UE-specific SS (USS);
transmitting, to the UE, an indication of a set of one or more candidate transmission configuration indicator (TCI) states including a first TCI state, wherein each respective candidate TCI state of the set of one or more candidate TCI states corresponds to a respective candidate DL-RS of the set of one or more candidate DL-RSs; and
monitoring for the UL data transmission from the UE corresponding to a CG-SDT occasion of the plurality of CG-SDT resources.

28. The method of claim 27, wherein the SS is associated with a plurality of transmission configuration indicator (TCI) states.

\* \* \* \* \*